US011774269B2

(12) United States Patent
Shim et al.

(10) Patent No.: US 11,774,269 B2
(45) Date of Patent: *Oct. 3, 2023

(54) LIGHT CONTROL CIRCUIT AND FREQUENCY DETECTOR OF OPTICAL ENCODER SYSTEM, AND OPERATING METHOD OF FREQUENCY DETECTOR

(71) Applicant: PixArt Imaging Inc., Hsin-Chu County (TW)

(72) Inventors: Kuan-Choong Shim, Penang (MY); Gim-Eng Chew, Penang (MY)

(73) Assignee: PixArt Imaging Inc., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,096

(22) Filed: Mar. 31, 2022

(65) Prior Publication Data
US 2022/0221312 A1 Jul. 14, 2022

Related U.S. Application Data

(63) Continuation of application No. 17/118,438, filed on Dec. 10, 2020, now Pat. No. 11,333,532.

(51) Int. Cl.
*G01D 5/347* (2006.01)
*G01D 5/244* (2006.01)

(52) U.S. Cl.
CPC ..... *G01D 5/34715* (2013.01); *G01D 5/24428* (2013.01); *G01D 5/24457* (2013.01); *G01D 5/24466* (2013.01); *G01D 5/24471* (2013.01); *G01D 5/24476* (2013.01); *G01D 5/3473* (2013.01)

(58) Field of Classification Search
CPC .......... G01D 5/34715; G01D 5/24428; G01D 5/24457; G01D 5/24466; G01D 5/24471; G01D 5/3473; G01D 5/24476; H05B 45/30; H05B 45/37
See application file for complete search history.

(56) References Cited

U.S. PATENT DOCUMENTS

| | | | | |
|---|---|---|---|---|
| 5,406,267 A | * | 4/1995 | Curtis | G01D 1/18 340/657 |
| 10,187,948 B1 | * | 1/2019 | Shim | H05B 45/10 |
| 11,333,532 B1 | * | 5/2022 | Shim | G01D 5/24428 |
| 2008/0231326 A1 | * | 9/2008 | Rai | G01D 5/2448 327/72 |
| 2012/0138781 A1 | * | 6/2012 | Rai | G01D 5/36 250/231.13 |
| 2017/0268907 A1 | * | 9/2017 | Lehmann | G01D 5/2291 |

FOREIGN PATENT DOCUMENTS

CA 2322874 A1 * 9/1999

* cited by examiner

*Primary Examiner* — Jennifer D Bennett
(74) *Attorney, Agent, or Firm* — WPAT, PC

(57) ABSTRACT

There is provided a light control circuit including a light detector, a frequency detector, an error amplifier, an NMOS driver and a light source. The frequency detector identifies a signal frequency according to detected voltage signals outputted by the light detector and generates a control signal accordingly. The NMOS driver changes a drive current of the light source according to an output of the error amplifier. The error amplifier changes a bandwidth thereof according to the control signal from the frequency detector to regulate a response time of the drive current of the light source.

18 Claims, 19 Drawing Sheets

LIGHT CONTROL CIRCUIT AND FREQUENCY DETECTOR OF OPTICAL ENCODER SYSTEM, AND OPERATING METHOD OF FREQUENCY DETECTOR

CROSS REFERENCE TO RELATED APPLICATION

This application is a continuation application of U.S. patent application Ser. No. 17/118,438 filed on Dec. 10, 2020, the full disclosure of which is incorporated herein by reference.

BACKGROUND

1. Field of the Disclosure

This disclosure generally relates to a light control circuit and, more particularly, to a light control circuit in an optical encoder system adapting to a frequency variation of the input signal and an operating method thereof.

2. Description of the Related Art

In an optical detection system, it is generally required to detect a stable light intensity. One method to achieve this requirement is to control a system light source to maintain stable emission intensity.

For example, FIG. 1 shows a conventional optical detection system which includes a light detector 91, a reference voltage generator 93, an error amplifier 95, an NMOS driver 97 and a light emitting diode (LED). The light detector 91 is used to detect modulated light to generate a detected signal, e.g., as shown in FIG. 2A. The light detector 91 also retrieves a common mode voltage $V_{CM}$ of the detected signal as an output signal Vdet. The reference voltage generator 93 outputs a reference voltage Vref based on a desired common mode voltage. The error amplifier 95 compares the output signal Vdet and the reference voltage Vref to cancel common mode noise. The NMOS driver 97 regulates a drive current of the LED according to an output of the error amplifier 95 to control emission intensity thereof.

However, as a signal frequency of the output signal Vdet of the light detector 91 can change with a rotation speed of a shaft to be detected, it is desired that a regulation response time of regulating the LED can also change corresponding to the signal frequency of the output signal Vdet.

Accordingly, it is necessary to provide a light control circuit of an optical encoder system adapting to a frequency variation of detected signals and an operating method thereof.

SUMMARY

The present disclosure provides a light control circuit of an optical encoder system and an operating method thereof that adjust a regulation speed of a light source by the drive current according to the comparison result of comparing the detected signal frequency and at least one frequency threshold.

The present disclosure further provides a light control circuit of an optical encoder system and an operating method thereof that adjusts the regulation response time of the drive current of a light source corresponding to different rotation directions of an encoding medium of the optical encoder system.

The present disclosure provides a frequency detector of an optical encoder system, the frequency detector configured to receive a first detected signal and a second detected signal from a trans-impedance amplifier of the optical encoder system. The frequency detector includes a low pass filter, a first comparator, a second comparator, and a flip flop. The low pass filter is configured to filter the first detected signal and having a cutoff frequency. The first comparator is configured to compare the filtered first detected signal and a first reference voltage to output a comparison signal. The second comparator is configured to compare the second detected signal and a second reference voltage to output a clock signal. A data input thereof being configured to receive the comparison signal, a clock input thereof being configured to receive the clock signal, and an output thereof being configured to generate an output signal, which is configured to change a bandwidth of an error amplifier of the optical encoder system when a phase of the first detected signal leads a phase of the fourth detected signal.

The present disclosure further provides an operating method of a frequency detector of an optical encoder system, which comprises a trans-impedance amplifier. The frequency detector includes a low pass filter, a first comparator, a second comparator and a first flip flop. The operating method includes the steps of: receiving, by the low pass filter, a first detected signal from the trans-impedance amplifier and outputting a filtered detected signal; comparing, by the first comparator, the filtered first detected signal and a first reference voltage to output a comparison signal; receiving, by the second comparator, a second detected signal from the trans-impedance amplifier to be compared with a second reference voltage to output a clock signal, wherein a phase of the first detected signal leads or lags a phase of the second detected signal by 90 degrees; and receiving, by the first flip flop, the comparison signal and the clock signal and generating a first output signal to change a bandwidth of an error amplifier of the optical encoder system when the phase of the first detected signal leads the phase of the second detected signal.

The present disclosure further provides a light control circuit of an optical encoder system configured to control a light source. The light control circuit includes a controller and a frequency detector. The controller includes an error amplifier which is configured to control a drive current of the light source. The frequency detector is configured to receive a first detected signal and a second detected signal from a trans-impedance amplifier of the optical encoder system, wherein a phase of the first detected signal leads or lags a phase of the second detected signal by 90 degrees, and includes a low pass filter, a first comparator, a second comparator, a first flip flop, a first inverter and a second flip flop. The low pass filter is configured to filter the first detected signal and having a cutoff frequency. The first comparator is configured to compare the filtered first detected signal and a first reference voltage to output a comparison signal. The second comparator is configured to compare the second detected signal and a second reference voltage to output a clock signal. A data input of the first flip flop is configured to receive the comparison signal, a clock input of the first flip flop is configured to receive the clock signal, and an output of the first flip flop is configured to generate a first output signal, which is configured to change a bandwidth of the error amplifier to regulate a response time of the drive current of the light source when the phase of the first detected signal leads the phase of the second detected signal by 90 degrees. The first inverter is configured to invert a phase of the clock signal. A data input of the second flip flop is configured to receive the comparison signal, a clock input of the second flip flop is configured to receive the phase-inverted clock signal, and an output of the second flip flop is configured to generate a second output signal, which is configured to change the bandwidth of the error amplifier to regulate the response time when the phase of the first detected signal lags the phase of the second detected signal by 90 degrees.

In the light control circuit of the present disclosure, a reference voltage generating circuit is formed by a constant voltage source, by a circuit having a reference squaring circuit and a converting circuit or by other voltage generators.

In the optical encoder system of the present disclosure, an encoding medium is formed with different codes to modulate incident light. The modulated reflection light impinges on different photodiodes of a light detector to generate current signals, e.g., sine signals and cos signals, having 90-degree phase shift from one another. A trans-impedance amplifier (TIA) is used to amplify and convert the current signals to voltage signals.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 3:
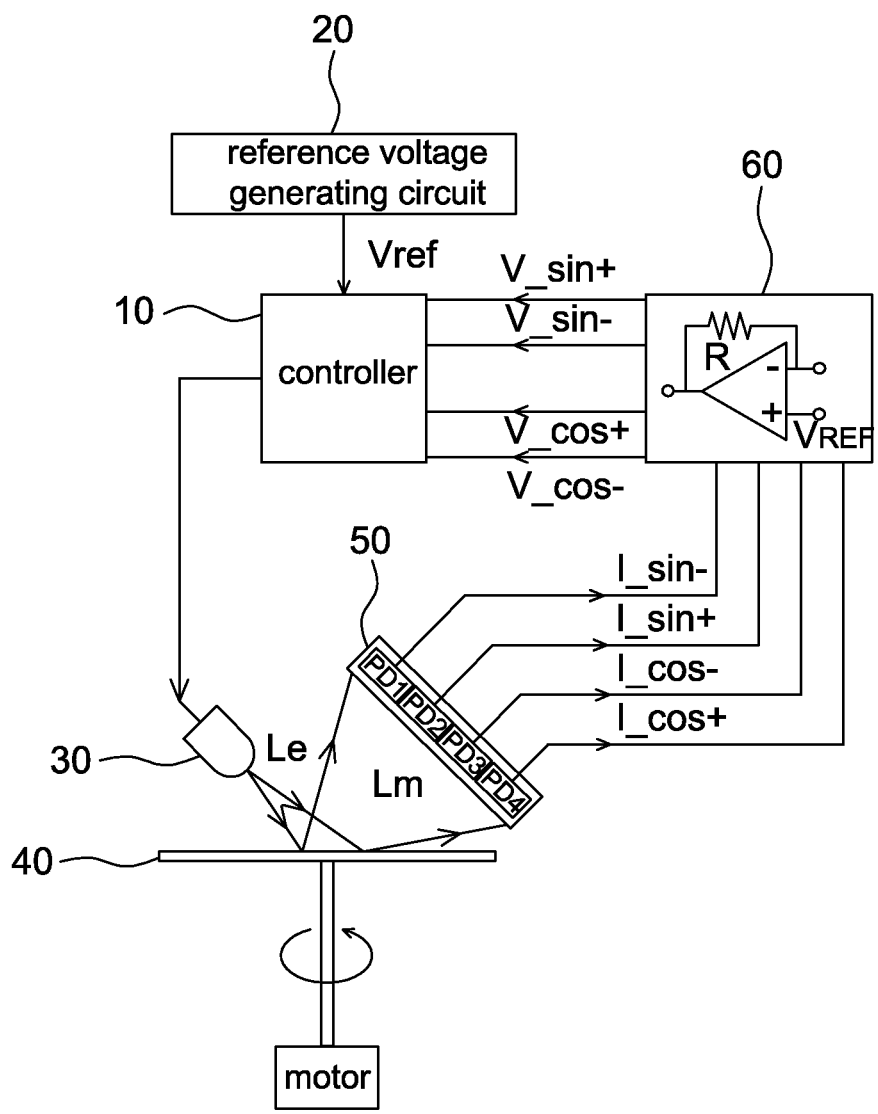
FIG. 3 is a schematic diagram of an optical encoder system according to one embodiment of the present disclosure.

Referring to FIG. 3, it is a schematic diagram of an optical encoder system 100 according to one embodiment of the present disclosure. The optical encoder system 100 includes a controller 10, a reference voltage generating circuit 20, a light source 30, an encoding medium 40, a light detector 50 and a trans-impedance amplifier (TIA) 60. In a non-limiting embodiment, the controller 10, the reference voltage generating circuit 20, the light source 30, the light detector 50 and the TIA 60 of the optical encoder system 100 are encapsulated, for example, in a same package to form a control module. The control module is arranged corresponding to the encoding medium 40 to perform a decoding operation.

In a non-limiting embodiment, the controller 10, the reference voltage generating circuit 20 and the TIA 60 form a light control circuit of the present disclosure. The light control circuit controls the light source 30 to emit stable light intensity according to the detection result of the light detector 50.

The encoding medium 40 is, for example, a code disk on which different codes are formed to modulate incident light from the light source 30. The light source 30 is, for example, a light emitting diode or a laser diode, to generate emission light Le of a predetermined wavelength (e.g., red light or infrared light) to illuminate the encoding medium 40. The incident light is modulated by codes on the encoding medium 40 to generate modulated reflection light Lm. FIG. 3 shows that the code disk is controlled by a motor to rotate in a counterclockwise direction, and thus different codes thereon are illuminated by the emission light Le of the light source 30 to generate the modulated reflection light Lm. As the encoding method of the encoding medium 40 is not an object of the present disclosure, any conventional encoding method can be used as long as the light detector 50 generates predetermined current signals (described below with an example) by sensing the modulated reflection light Lm.

The light detector 50 is arranged at a proper location to receive the modulated reflection light Lm. The light detector 50 is, for example, a CCD image sensor, a CMOS image sensor or other sensors for detecting light energy to generate electrical signals. For example, the light detector 50 includes a first photodiode PD1, a second photodiode PD2, a third photodiode PD3 and a fourth photodiode PD4 configured to receive the modulated reflection light Lm and respectively generate a first current signal I_sin−, a second current signal I_sin+, a third current signal I_cos− and a fourth current signal I_cos+, wherein the first current signal I_sin− and the second current signal I_sin+ (e.g., sign signals) are out of phase, the third current signal I_cos− and the fourth current signal I_cos+(e.g., cos signals) are out of phase, the first current signal I_sin− has a 90-degree phase shift (i.e. perpendicular) from the third current signal I_cos−, and the second current signal I_sin+ has a 90-degree phase shift (i.e. perpendicular) from the fourth current signal I_cos+.

It should be mentioned that although FIG. 3 shows only four photodiodes PD1 to PD4, the present disclosure is not limited thereto. In a non-limiting embodiment, each of the photodiodes PD1 to PD4 in FIG. 3 includes multiple photodiodes, and each of the current signals is an average current or a current summation of the multiple photodiodes of each photodiode group. For example, the first current signal I_sin− is an average current or a current summation of multiple first photodiodes PD1, the second current signal I_sin+ is an average current or a current summation of multiple second photodiodes PD2 and so on.

The TIA 60 is a conventional single-stage or multi-stage trans-impedance amplifier without particular limitations as long as an input signal is amplified with a predetermined gain to a predetermined peak-to-peak value (e.g., 1 volt. peak-to-peak voltage, but not limited to). The TIA 60 is used to amplify and convert the first current signal I_sin−, the second current signal I_sin+, the third current signal I_cos− and the fourth current signal I_cos+ to respectively generate and output a first detected signal V_sin−, a second detected signal V_sin+, a third detected signal V_cos− and a fourth detected signal V_cos+, wherein the first detected signal V_sin− and the third detected signal V_cos− have a 90-degree phase shift, the third detected signal V_cos− and the second detected signal V_sin+ have a 90-degree phase shift, and the second detected signal V_sin+ and the fourth detected signal V_cos+ have a 90-degree phase shift.

In one embodiment, the TIA 60 does not change phases of the first current signal I_sin−, the second current signal I_sin+, the third current signal I_cos− and the fourth current signal I_cos+ during current-voltage conversion such that the first detected signal V_sin−, the second detected signal V_sin+, the third detected signal V_cos− and the fourth detected signal V_cos+ respectively have an identical phase with the first current signal I_sin−, the second current signal I_sin+, the third current signal I_cos− and the fourth current signal I_cos+.

In another embodiment, the TIA 60 changes a same phase of the first current signal I_sin−, the second current signal I_sin+, the third current signal I_cos− and the fourth current signal I_cos+ during current-voltage conversion such that the first detected signal V_sin−, the second detected signal V_sin+, the third detected signal V_cos− and the fourth detected signal V_cos+ respectively have a same phase offset from the first current signal I_sin−, the second current signal I_sin+, the third current signal I_cos− and the fourth current signal I_cos+. That is, the phase relationship between the first detected signal V_sin−, the second detected signal V_sin+, the third detected signal V_cos− and the fourth detected signal V_cos+ is substantially identical to that between the first current signal I_sin−, the second current signal I_sin+, the third current signal I_cos− and the fourth current signal I_cos+.

Figure 4:
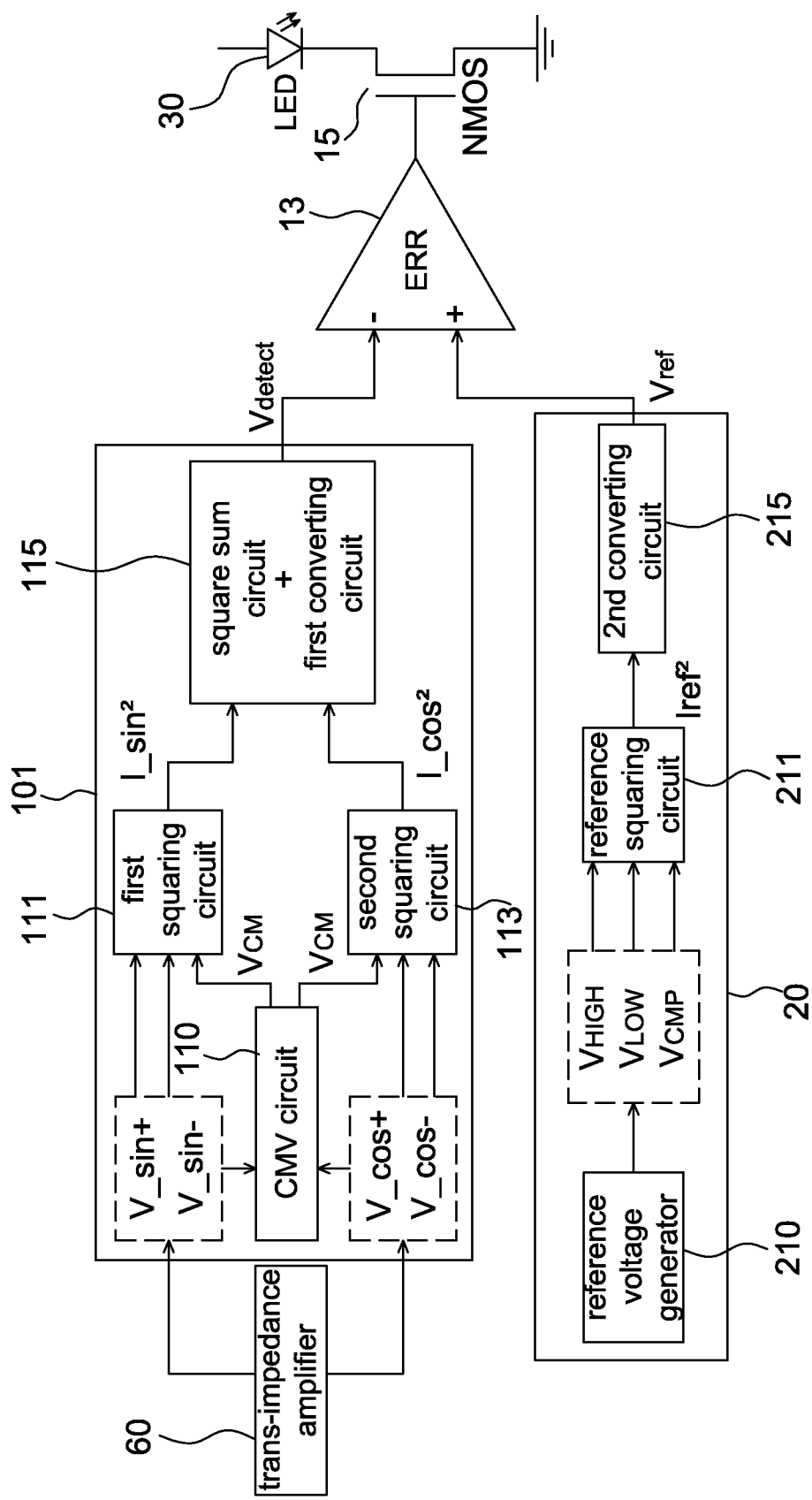
FIG. 4 is a block diagram of a light control circuit according to one embodiment of the present disclosure.

Referring to FIG. 4, it is a block diagram of a light control circuit according to one embodiment of the present disclosure. It should be mentioned that although FIG. 3 shows that the reference voltage generating circuit 20 and the TIA 60 is arranged outside of the controller 10, the present disclosure is not limited thereto. In a non-limiting embodiment, the reference voltage generating circuit 20 and the TIA 60 are included in the controller 10.

The detected voltage generating circuit 101 of the controller 10 includes a common mode voltage circuit 110, a first squaring circuit 111, a second squaring circuit 113, and a square sum circuit and first converting circuit 115. The controller 10 further includes an error amplifier 13 and an NMOS driver 15.

The common mode voltage circuit 110 includes an averaging resistor circuit for averaging the first detected signal V_sin−, the second detected signal V_sin+, the third detected signal V_cos− and the fourth detected signal V_cos+. For example referring to FIG. 5, the averaging resistor circuit of the common mode voltage circuit 110 includes an averaging resistor R1 for receiving the first detected signal V_sin−, an averaging resistor R2 for receiving the second detected signal V_sin+, an averaging resistor R3 for receiving the third detected signal V_cos− and an averaging resistor R4 for receiving the fourth detected signal V_cos+. The averaging resistor circuit of the common mode voltage circuit 110 further includes an averaging resistor R5 connecting the averaging resistors R1 and R2 and an averaging resistor R6 connecting the averaging resistors R3 and R4. The common mode voltage circuit 110 generates a common mode voltage signal $V_{CM}$ according to the first detected signal V_sin−, the second detected signal V_sin+, the third detected signal V_cos− and the fourth detected signal V_cos+.

Figure 6:
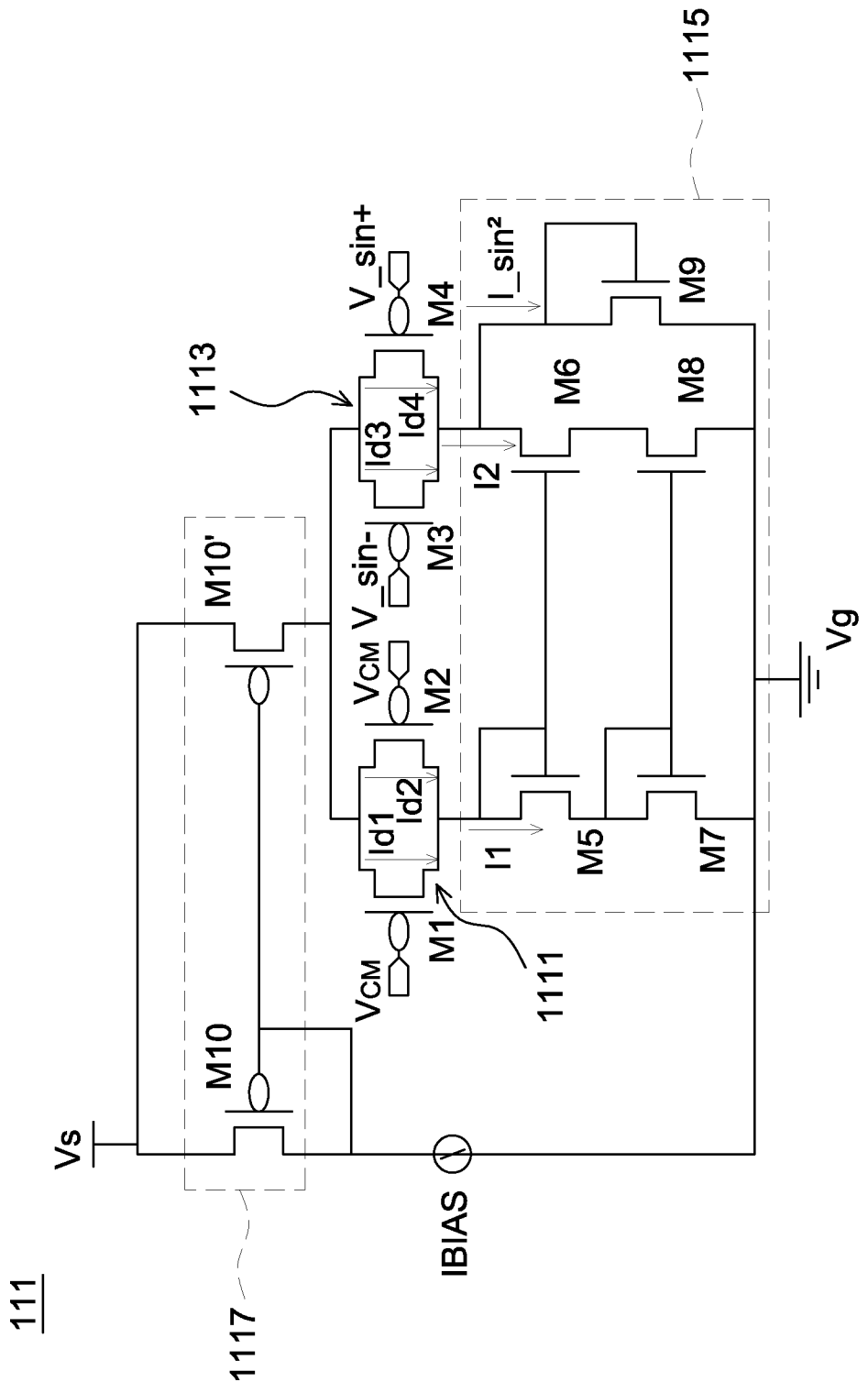
FIG. 6 is a circuit diagram of a squaring circuit of a light control circuit according to one embodiment of the present disclosure.

The first squaring circuit 111 is used to receive the first detected signal V_sin−, the second detected signal V_sin+ and the common mode voltage signal $V_{CM}$, and output a first current squaring signal I_sin$^2$. Referring to FIG. 6, it is a circuit diagram of a first squaring circuit 111 according to one embodiment of the present disclosure. The first squaring circuit 111 includes a first transistor group 1111, a second transistor group 1113, a first subtraction circuit 1115 and a first biasing circuit 1117. FIG. 6 shows that transistors in the first transistor group 1111, the second transistor group 1113 and the first biasing circuit 1117 are PMOS transistors, and transistors in the first subtraction circuit 1115 are NMOS transistors, but the present disclosure is not limited thereto.

The first transistor group 1111 includes two transistors M1 and M2 having drains and sources coupled to each other as shown in FIG. 6. Gates of the two transistors M1 and M2 of the first transistor group 1111 are respectively configured to receive the common mode voltage signal $V_{CM}$. The first transistor group 1111 is configured to output a first current I1.

The second transistor group 1113 includes two transistors M3 and M4 having drains and sources coupled to each other as shown in FIG. 6. Gates of the two transistors M3 and M4 of the second transistor group 1113 are respectively configured to receive the first detected signal V_sin− and the second detected signal V_sin+. The second transistor group 1113 is configured to output a second current I2.

The first biasing circuit 1117 is connected between a voltage source Vs and the first transistor group 1111 as well as the second transistor group 1113 as shown in FIG. 6. The first biasing circuit 1117 includes two transistors M10 and M10' having gates thereof coupled to each other. Sources of the two transistors M10 and M10' of the first biasing circuit 1117 are coupled to the voltage source Vs. The gate of one of the two transistors (shown as M10 herein) of the first biasing circuit 1117 is coupled to a drain thereof. A drain of the other one of the two transistors (shown as M10' herein) of the first biasing circuit 1117 is coupled to sources of the two transistors M1 and M2 of the first transistor group 1111 and sources of the two transistors M3 and M4 of the second transistor group 1113.

The first subtraction circuit 1115 is connected between ground voltage Vg and the first transistor group 1111 as well as the second transistor group 1113 as shown in FIG. 6. The first subtraction circuit 1115 is configured to perform a differential operation on the first current I1 and the second current I2 to generate a first current squaring signal I_sin$^2$.

According to the principle of transistors, a drain current Id3 of the transistor M3 is indicated by equation (1):

$$Id3=[Vs-(V_G+Vamp1)-Vtp]^2 \times K/2=(Vr-Vamp1)^2 \times K/2 \quad (1)$$

wherein, Vr=Vs−V$_G$−Vtp, V$_G$ is a gate voltage of the transistor M3, Vamp1 is an amplitude of V_sin−, K is a conductive parameter, and Vtp is a threshold voltage.

Similarly, a drain current Id4 of the transistor M4 is indicated by equation (2):

$$Id4=(Vr-Vamp2)^2 \times K/2 \quad (2)$$

wherein Vamp2 is an amplitude of V_sin+.

Similarly, a drain current Id1 of the transistor M1 and a drain current Id2 of the transistor M2 are indicated by equation (3):

$$Id1=Id2=K \times Vr^2 \quad (3)$$

Assuming Vamp1=Vamp2=Vamp, it is obtained that (Id3+Id4)−(Id1+Id2)=K×Vamp$^2$=I_sin$^2$, which is referred to a first current squaring signal herein.

The first subtraction circuit 1115 includes a fifth transistor M5, a sixth transistor M6, a seventh transistor M7, an eighth transistor M8 and a ninth transistor M9.

A gate of the fifth transistor M5 is coupled to a drain thereof, and the drain of the fifth transistor M5 is coupled to drains of the two transistors M1 and M2 of the first transistor group 1111 to receive the first current I1.

A gate of the sixth transistor M6 is coupled to the gate of the fifth transistor M5, and a drain of the sixth transistor M6 is coupled to drains of the two transistors M3 and M4 of the second transistor group 1113 to receive the second current I2.

A gate of the seventh transistor M7 is coupled to a drain thereof, the drain of the seventh transistor M7 is coupled to a source of the fifth transistor M5, and a source of the seventh transistor M7 is coupled to the ground voltage Vg.

A gate of the eighth transistor M8 is coupled to the gate of the seventh transistor M7, a drain of the eighth transistor M8 is coupled to a source of the sixth transistor M6, and a source of the eighth transistor M8 is coupled to the ground voltage Vg.

A gate of the ninth transistor M9 is coupled to a drain thereof, the drain of the ninth transistor M9 is coupled between the drain of the sixth transistor M6 and the second transistor group 1113, and a source of the ninth transistor M9 is coupled to the ground voltage Vg. The first current squaring signal I_sin$^2$ flows through the ninth transistor M9.

It should be mentioned that although FIG. 6 shows that the first current I1 flows through two cascaded transistors M5 and M7, and the second current I2 flows through two cascaded transistors M6 and M8, but the present disclosure is not limited thereto. A number of transistors that the first current I1 and the second current I2 go through is not limited to 2 and is determined according to the circuit parameter.

The second squaring circuit 113 is used to receive the third detected signal V_cos−, the fourth detected signal V_cos+ and the common mode voltage signal V$_{CM}$, and output a second current squaring signal I_cos$^2$.

Figure 7:
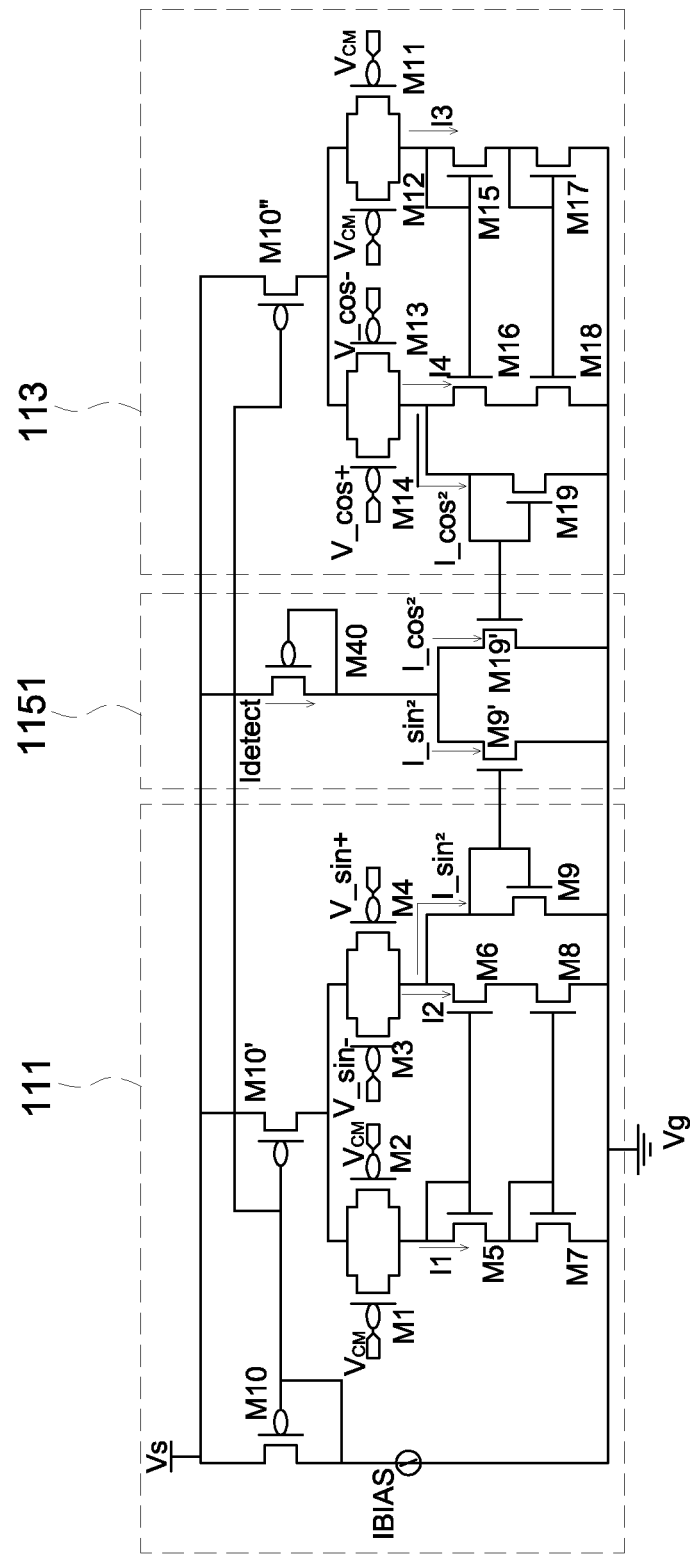
FIG. 7 is a partial circuit diagram of a controller of a light control circuit according to one embodiment of the present disclosure.

Referring to FIG. 7, it is a partial circuit diagram of a controller 10 according to one embodiment of the present disclosure. The second squaring circuit 113 is similar to the first squaring circuit 111, and the main difference therebetween is that detected signals to be received are different. The second squaring circuit 113 includes a third transistor group including M11 and M12, a fourth transistor group including M13 and M14, a second biasing circuit and a second subtraction circuit. For simplifying the diagram, FIG. 7 does not show reference numerals to indicate the third transistor group, the fourth transistor, the second biasing circuit and the second subtraction circuit.

FIG. 7 shows that transistors in the third transistor group, the fourth transistor group and the second biasing circuit are PMOS transistors, and transistors in the second subtraction circuit are NMOS transistors, but not limited thereto.

The third transistor group includes two transistors M11 and M12 having drains and sources coupled to each other as shown in FIG. 7. Gates of the two transistors M11 and M12 of the third transistor group are respectively configured to receive the common mode voltage signal V$_{CM}$. The third transistor group is configured to output a third current I3.

The fourth transistor group includes two transistors M13 and M14 having drains and sources coupled to each other as shown in FIG. 7. Gates of the two transistors M13 and M14 of the fourth transistor group are respectively configured to receive the third detected signal V_cos− and the fourth detected signal V_cos+. The fourth transistor group is configured to output a fourth current I4.

The second biasing circuit is connected between a voltage source Vs and the third transistor group as well as the fourth transistor group as shown in FIG. 7. The second biasing circuit includes two transistors M10 and M10" having gates thereof coupled to each other. Sources of the two transistors M10 and M10" of the second biasing circuit are coupled to the voltage source Vs. The gate of one of the two transistors (shown as M10 herein) of the second biasing circuit is coupled to a drain thereof. A drain of the other one of the two transistors (shown as M10" herein) of the second biasing circuit is coupled to sources of the two transistors M11 and M12 of the third transistor group and sources of the two transistors M13 and M14 of the fourth transistor group.

The second subtraction circuit is connected between ground voltage Vg and the third transistor group as well as the fourth transistor group as shown in FIG. 7. The second subtraction circuit is configured to perform a differential operation on the third current I3 and the fourth current I4 to generate the second current squaring signal I_cos$^2$, wherein the method of the second squaring circuit 113 generating the second current squaring signal I_cos$^2$ is similar to the first squaring circuit 111 generating the first current squaring signal I_sin$^2$, e.g., referring to equations (1)-(3), and thus details thereof are not repeated herein. The second subtraction circuit includes a transistor M15, a transistor M16, a transistor M17, a transistor M18 and a transistor M19, and the connection between the transistors M15 to M19 in the second subtraction circuit is similar to that in the first subtraction circuit 1115 and shown in FIG. 7, and thus details thereof are not repeated herein.

Figure 8:
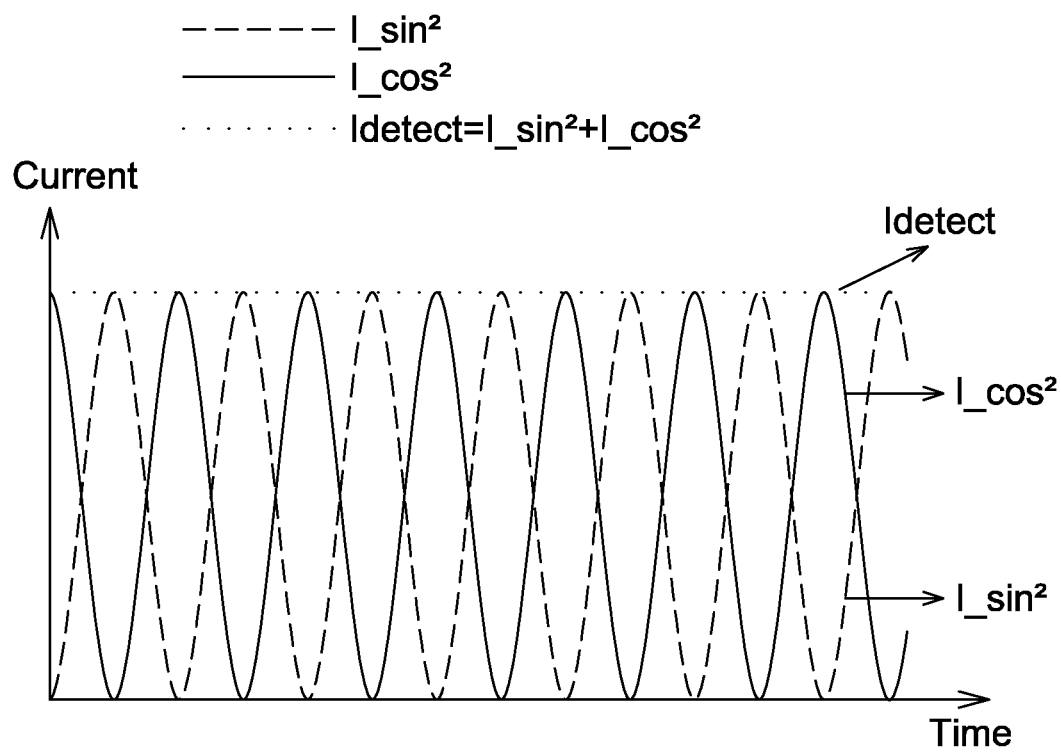
FIG. 8 is a schematic diagram showing a sum of current squaring of a light control circuit according to one embodiment of the present disclosure.

Referring to FIG. 7 again, the square sum circuit 1151 is used to calculate a sum of current squaring (I_sin$^2$+I_cos$^2$) of the first current squatting signal I_sin$^2$ and the second current squatting signal I_cos$^2$ to generate a dc electrical signal Idetect as shown in FIG. 8.

The square sum circuit 1151 includes a fifth transistor group including M9' and M19' and a square sum transistor M40, wherein FIG. 7 shows that transistors in the fifth transistor group are NMOS transistors, and the square sum transistor M40 is a PMOS transistor, but not limited thereto. The fifth transistor group includes two transistors M9' and M19' having drains and sources coupled to each other. Gates of the two transistors M9' and M19' of the fifth transistor group are respectively coupled to the transistor M9 of the first subtraction circuit 1115 and the transistor M19 of the second subtraction circuit to reflect the first current squaring signal I_sin² and the second current squaring signal I_cos². That is, the transistor M9' and the transistor M9 form a current mirror, and the transistor M19' and the transistor M19 form another current mirror. It is assumed that the mirror ratio herein is 1.

A source of the square sum transistor M40 is coupled to the voltage source Vs. A gate of the square sum transistor M40 is coupled to a drain thereof. The drain of the square sum transistor M40 is coupled to the drains of the two transistors M9' and M19' of the fifth transistor group to generate the sum of current squaring Idetect=(I_sin²+I_cos²).

Figure 9:
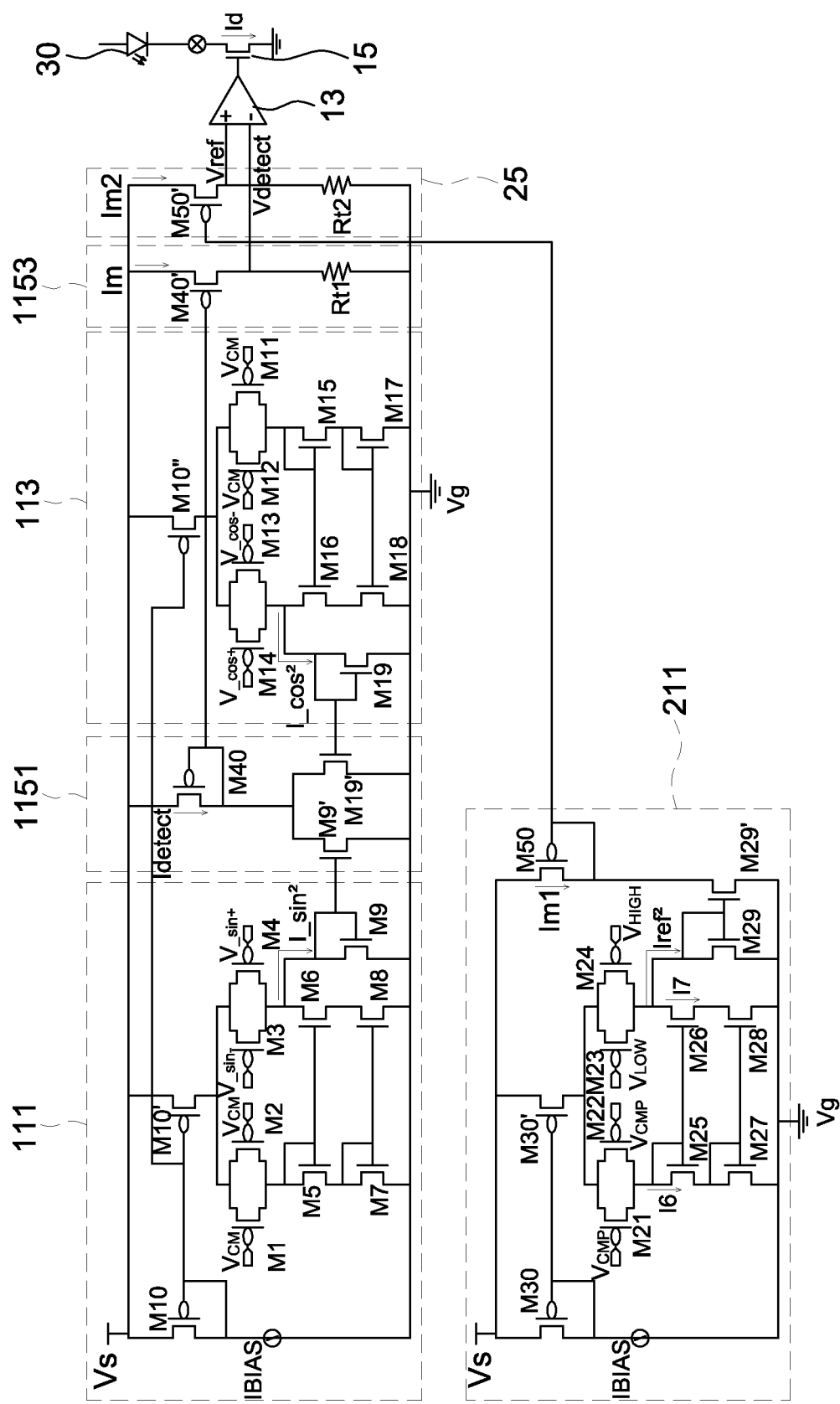
FIG. 9 is a circuit diagram of a light control circuit according to one embodiment of the present disclosure.

Referring to FIG. 9, it is a circuit diagram of a light control circuit according to one embodiment of the present disclosure. The first converting circuit 1153 is used to convert the sum of current squaring Idetect to a detected voltage signal Vdetect. The first converting circuit 1153 includes a first converting transistor M40' and a first converting resistor Rt1 coupled together.

A gate of the first converting transistor M40' is coupled to a gate of the square sum transistor M40 to generate a mirror current Im of the sum of current squaring (I_sin²+I_cos²). When the mirror ratio is 1, the mirror current Im is substantially equal to the sum of current squaring Idetect=(I_sin²+I_cos²).

Figure 5:
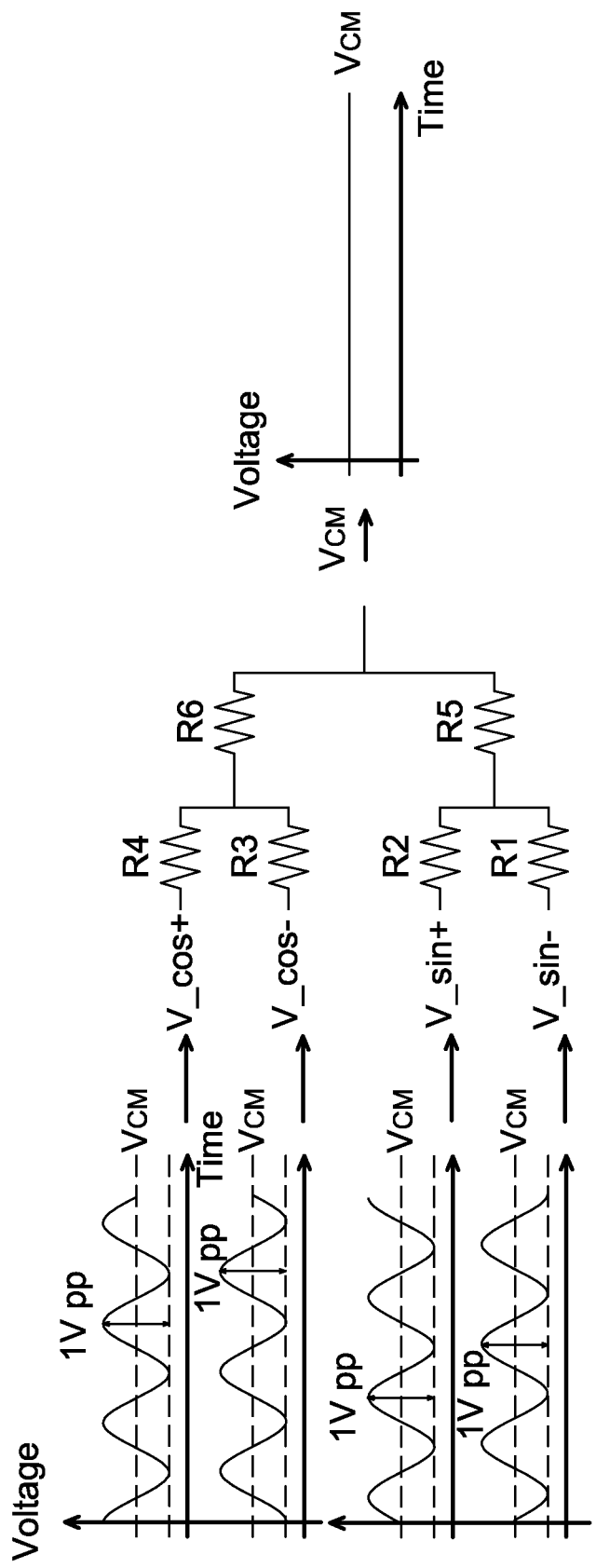
FIG. 5 is a schematic diagram of a common mode voltage circuit of a light control circuit according to one embodiment of the present disclosure.

When the mirror current Im of the sum of current squaring flows through the first converting resistor Rt1, a detected voltage signal Vdetect is generated. In this way, the detected voltage generating circuit 101 converts the voltage signals having different phases (e.g., as shown in FIG. 5) to a dc signal which is used a negative feedback for controlling a drive current of the light source 30.

The reference voltage generating circuit 20 is used to generate a reference voltage signal Vref to one input terminal of the error amplifier 13, e.g., a positive input as shown in FIG. 4. The reference voltage signal Vref is a predetermined voltage used to control the NMOS driver 15 to drive the light source 30 with a desired drive current.

In a non-limiting embodiment, the reference voltage generating circuit 20 includes a constant voltage source to output the reference voltage signal Vref.

In a non-limiting embodiment, the reference voltage generating circuit 20 includes a reference voltage generator 210, a reference squaring circuit 211 and a second converting circuit 215 as shown in FIG. 4, wherein the reference squaring circuit 211 has the same circuit structure as the first squaring circuit 111 to overcome the environmental (e.g., voltage and temperature) variation, and the difference is in their input voltage signals.

The reference voltage generator 210 is used to generate a desired first amplitude voltage $V_{HIGH}$, a desired second amplitude voltage $V_{LOW}$ and a desired common mode voltage $V_{CMP}$ (all previously determined), wherein the desired common mode voltage $V_{CMP}$ is an average value of the desired first amplitude voltage $V_{HIGH}$ and the desired second amplitude voltage $V_{LOW}$; the first amplitude voltage $V_{HIGH}$ is higher than the second amplitude voltage $V_{LOW}$. In one non-limiting embodiment, the first amplitude voltage $V_{HIGH}$ and the second amplitude voltage $V_{LOW}$ are selected according to the product specification. The desired common mode voltage $V_{CMP}$ is a predetermined voltage for defining a value of the drive current of the light source 30. That is, when the detected voltage signal Vdetect is larger than the desired common mode voltage $V_{CMP}$, the drive current of the light source 30 is reduced by the NMOS driver 15 to lower the emission intensity. On the contrary, when the detected voltage signal Vdetect is smaller than the desired common mode voltage $V_{CMP}$, the drive current of the light source 30 is increased by the NMOS driver 15 to enhance the emission intensity to keep a substantially identical drive current.

The reference squaring circuit 211 is used to receive the desired first amplitude voltage $V_{HIGH}$, the desired second amplitude voltage $V_{LOW}$ and the desired common mode voltage $V_{CMP}$, and output a reference current squaring signal Iref². The second converting circuit 215 includes a second converting transistor M50' and a second converting resistor Rt2 coupled together for converting the reference current squaring signal Iref² to the reference voltage signal Vref. Functions of the second converting transistor M50' and second converting resistor Rt2 are similar to those of the first converting transistor M40' and first converting resistor Rt1.

For example referring to FIG. 9, the reference squaring circuit 211 includes a sixth transistor group including M21 and M22, a seventh transistor group including M23 and M24, a third biasing circuit including M30 and M30', a third subtraction circuit including M25 to M29 and a current mirror circuit including M50 and M29'.

The sixth transistor group includes two transistors M21 and M22 (shown as PMOS transistors herein) having drains and sources coupled to each other as shown in FIG. 9. Gates of the two transistors M21 and M22 of the sixth transistor group are respectively configured to receive the desired common mode voltage $V_{CMP}$. The sixth transistor group is configured to output a sixth current I6.

The seventh transistor group includes two transistors M23 and M24 (shown as PMOS transistors herein) having drains and sources coupled to each other as shown in FIG. 9. Gates of the two transistors M23 and M24 of the seventh transistor group are respectively configured to receive the second voltage $V_{LOW}$ and the desired first amplitude voltage $V_{HIGH}$. The seventh transistor group is configured to output a seventh current I7.

The third biasing circuit is connected between a voltage source Vs and the sixth transistor group as well as the seventh transistor group. For example, the third biasing circuit includes two transistors M30 and M30' (shown as PMOS transistors herein) having gates thereof coupled to each other. Sources of the two transistors M30 and M30' of the third biasing circuit are coupled to the voltage source Vs. The gate of one of the two transistors (shown as M30 herein) of the third biasing circuit is coupled to a drain thereof. A drain of the other one of the two transistors (shown as M30' herein) of the third biasing circuit is coupled to sources of the two transistors M21 and M22 of the sixth transistor group and sources of the two transistors M23 and M24 of the seventh transistor group.

The third subtraction circuit is connected between ground voltage Vg and the sixth transistor group as well as the seventh transistor group. The third subtraction circuit is configured to perform a differential operation on the sixth current I6 and the seventh current I7 to generate the reference current squaring signal Iref². For example, the third subtraction circuit includes a transistor M25, a transistor M26, a transistor M27, a transistor M28 and a transistor M29, wherein FIG. 9 shows that transistors included in the third subtraction circuit are NMOS transistors, but not limited thereto.

A gate of the transistor M25 is coupled to a drain thereof. The drain of the transistor M25 is coupled to drains of the two transistors M21 and M22 of the sixth transistor group to receive the sixth current I6.

A gate of the transistor M26 is coupled to the gate of the transistor 25. A drain of the transistor M26 is coupled to drains of the two transistors M23 and M24 of the seventh transistor group to receive the seventh current I7.

A gate of the transistor M27 is coupled to a drain thereof. The drain of the transistor M27 is coupled to a source of the transistor M25. A source of the transistor M27 is coupled to the ground voltage Vg.

A gate of the transistor M28 is coupled to the gate of the transistor M27. A drain of the transistor M28 is coupled to a source of the transistor M26. A source of the transistor M28 is coupled to the ground voltage Vg.

A gate of the transistor M29 is coupled to a drain thereof. The drain of the transistor M29 is coupled between the drain of the transistor M26 and the seventh transistor group. A source of the transistor M29 is coupled to the ground voltage Vg. The drain current of the transistor M29 is obtained by subtraction between the sixth current I6 and the seventh current I7 as the reference current squaring signal $Iref^2$. The generating of $Iref^2$ is similar to $I\_sin^2$ and can be referred to equations (1)-(3).

The current mirror circuit is used to generate a first mirror current Im1 of the reference current squaring signal $Iref^2$. When a mirror ratio is 1, the first mirror current Im1 is substantially identical to the reference current squaring signal $Iref^2$. The current mirror circuit includes a transistor M29' which is used to form a current mirror with the transistor M29, and further includes a transistor 50 for forming a current mirror with the second converting transistor M50' in a second converting circuit 25.

The second converting circuit 25 includes a second converting transistor M50' and a second converting resistor Rt2 coupled to each other. A gate of the second converting transistor M50' is coupled to a gate of the transistor M50 of the current mirror circuit to reflect the first mirror current Im1 to generate a second mirror current Im2 of the reference current squaring signal $Iref^2$. Similarly, when a mirror ratio of the second current mirror M50 and M50' is 1, the second mirror current Im2 is substantially identical to the reference current squaring signal $Iref^2$. When the second mirror current Im2 of the reference current squaring signal $Iref^2$ flows through the second converting resistor Rt2, a reference voltage signal Vref is generated.

Other non-described component connections are shown in FIG. 9.

A first input terminal (shown as negative input herein) of the error amplifier 13 receives the detected voltage signal Vdetect, and a second input terminal (shown as positive input herein) of the error amplifier 13 receives the reference voltage signal Vref to perform the comparison therebetween. It should be mentioned that voltage signals received from the first input terminal and the second input terminal of the error amplifier 13 are exchangeable.

The NMOS driver 15 is coupled to an output terminal of the error amplifier 13. The NMOS driver 15 is used to regulate a drain current Id thereof according to a comparison result of the error amplifier 13, wherein the drain current Id is used as a drive current of the light source 30.

It should be mentioned that although in the above embodiment the mirror ratio of every current mirror is assumed to be 1, the present disclosure is not limited thereto. The mirror ratio of every current mirror may not be selected as 1 as long as the reference voltage signal Vref inputted into the error amplifier 13 is controlled at a desired value.

It should be mentioned that although in the above embodiment the encoding medium 40 is described as a reflection type and performing a rotating operation, the present disclosure is not limited thereto. In other embodiments, the encoding medium 40 is a transmissive type (i.e., the light source and the light detector are arranged at different sides) and is transparent or semi-transparent to light from the light source 300. In other embodiments, the encoding medium 40 40 performs one-dimension, two-dimension or three-dimension linear movement.

It should be mentioned that although in the above embodiment the light control circuit is described by applying to an optical encoder system 100, the present disclosure is not limited thereto. The light control circuit is adaptable to any application that requires controlling the emission intensity of a light source stably. In addition, the emission intensity of a light source is not limited to be controlled by controlling the drive current thereof, and it is also possible to control a drive voltage thereof depending on the light source being used. For example, a drive voltage is generated by directing the drain current of the NMOS driver to pass through a resistor.

The present disclosure further provides optical encoder systems 100' and 100'' that adjust a regulation response time of the drain current of the NMOS driver corresponding to a rotation speed (corresponding to a rotation speed of motor) of the encoding medium 40. The optical encoder systems 100' and 100'' adopt a frequency detector 70 for detecting a signal frequency (determined by the rotation speed of the encoding medium 40) of detected signals associated with the encoding medium 40. The control signal I_ctrl outputted by the frequency detector 70 is used to turn on or turn off a bias current I31 in the error amplifier 13 for regulating a response time of the light source 30 driven by a drive current (i.e. the drain current).

Figure 10A:
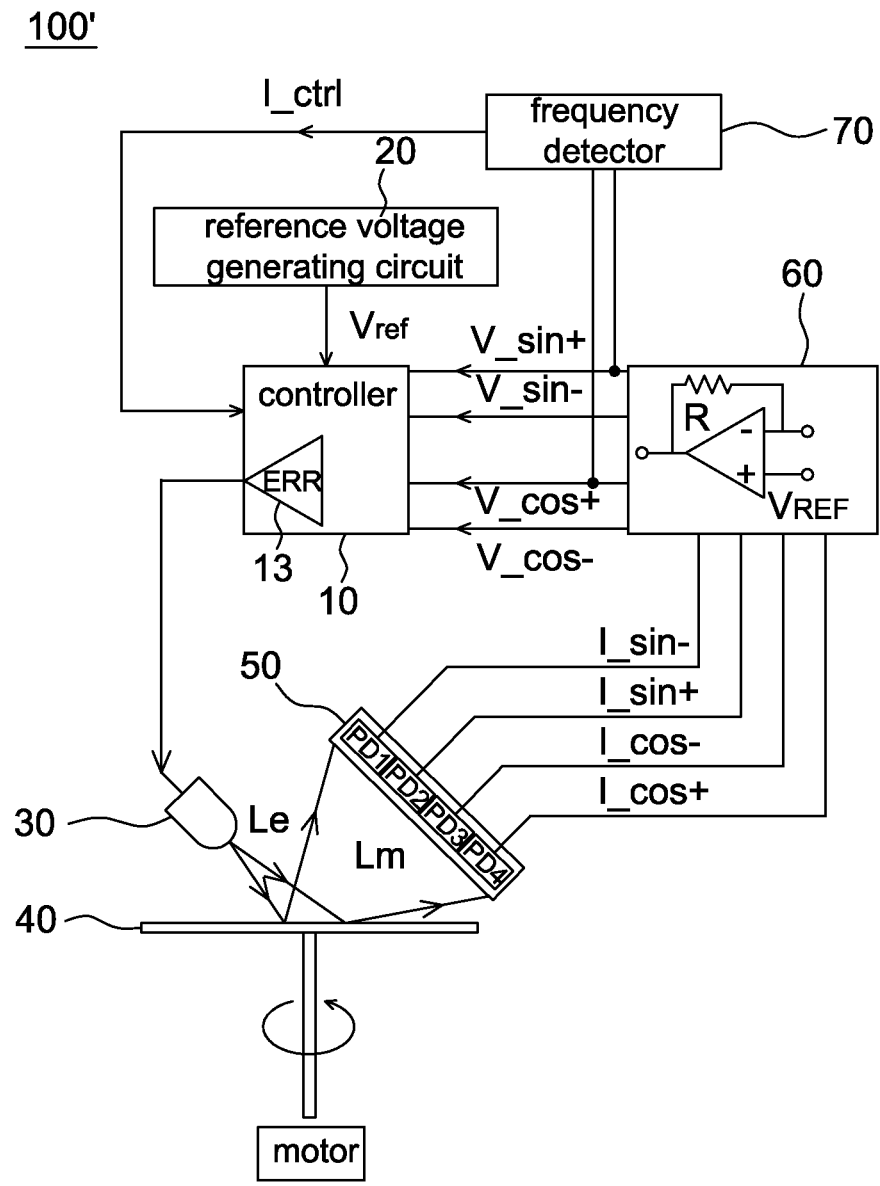
FIG. 10A is a schematic block diagram of a light control circuit according to another embodiment of the present disclosure.

Referring to FIG. 10A, it is a schematic block diagram of an optical encoder system 100' according to another embodiment of the present disclosure. The difference between FIGS. 10A and 3 is that the optical encoder system 100' in FIG. 10A further includes a frequency detector 70 for receiving detected signals (shown as the second detected signal V_sin+ and the fourth detected signal V_cos+ herein) to accordingly identify a signal frequency thereof. The frequency detector 70 further controls a bias current I31 in the error amplifier 13 according to a comparison result of comparing the signal frequency and a predetermined frequency, wherein the bias current I31 is used to increase or decrease a bandwidth of the error amplifier 13 to regulate a response time of the drive current of the light source 30.

More specifically, when the encoding medium 40 is rotating at a higher speed, a regulation response time of the light source 30 is preferably set faster to increase a regulation speed; whereas, when the encoding medium 40 is rotating in a slower speed, the regulation response time of the light source 30 is preferably set slower to decrease the regulation speed.

As shown in FIG. 10A, the controller 10 receives a first detected signal V_sin−, a second detected signal V_sin+, a third detected signal V_cos− and a fourth detected signal V_cos+ associated with the encoding medium 40, wherein the method of generating these four detected signals has been described above and thus are not repeated herein.

Figure 10B:
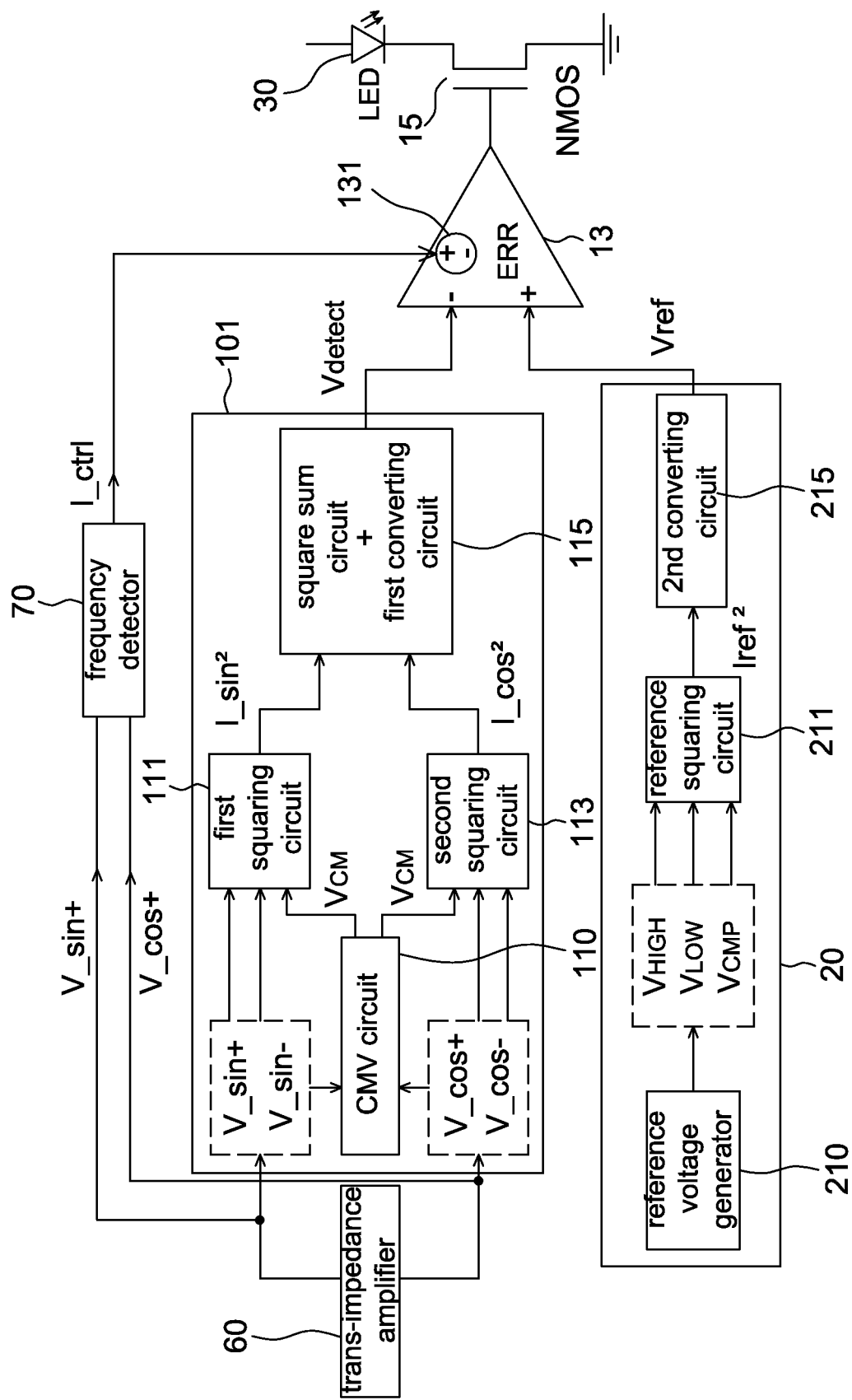
FIG. 10B is another schematic block diagram of a light control circuit according to another embodiment of the present disclosure.

Please referring to FIG. 10B, it is another schematic block diagram of an optical encoder system 100' according to another embodiment of the present disclosure. As mentioned above, the optical encoder system 100' includes a detected voltage generating circuit 101, an error amplifier 13 and an NMOS driver 15, wherein an output of the error amplifier 13 is used to control a drive current of the light source 30, and details thereof have been described above and are not repeated herein. The error amplifier 13 of the optical encoder system 100' includes a bias current I31 which is controlled by a control signal I_ctrl, e.g., turned on/off or increasing/decreasing current. It should be mentioned that the implementation of the controller 10 is not limited to FIG. 10B. Any circuit that is used to generate, according to the first detected signal V_sin−, the second detected signal V_sin+, the third detected signal V_cos− and the fourth detected signal V_cos+, a detected voltage signal as one input of the error amplifier 13 to be compared with the reference voltage Vref is adaptable to the controller 10.

Figure 11:
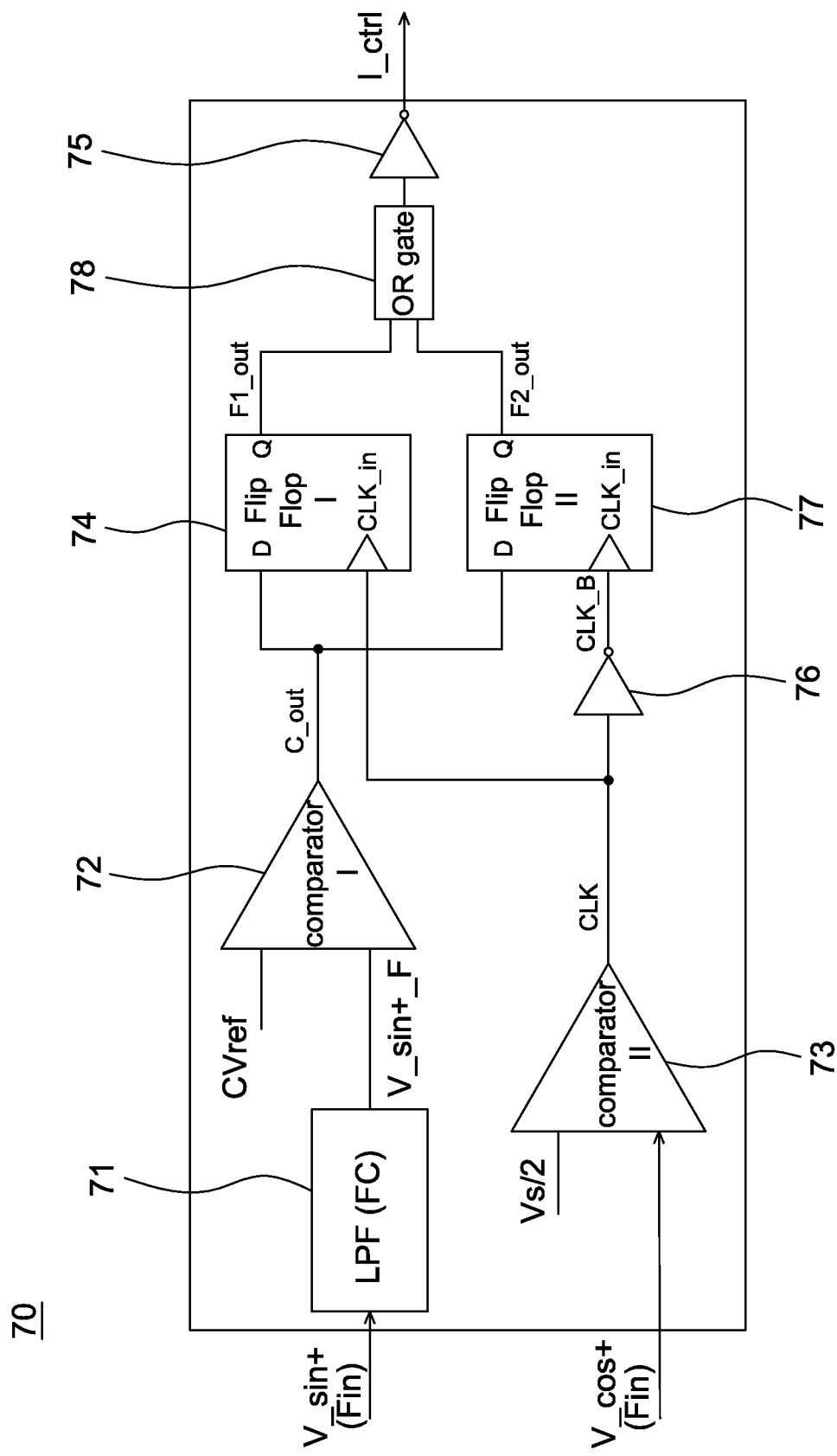
FIG. 11 is a schematic block diagram of a frequency detector of a light control circuit according to another embodiment of the present disclosure.

Referring to FIG. 11, it is a schematic block diagram of a frequency detector 70 of a light control circuit of an optical encoder system 100' according to another embodiment of the present disclosure. The frequency detector 70 receives the second control signal V_sin+ and the fourth detected signal V_cos+ to generate a control signal I_ctrl for controlling the bias current I31 in the error amplifier 13. In one aspect, the frequency detector 70 includes a low pass filter (LPF) 71, a first comparator 72, a second comparator 73, a first flip flop 74 and a second inverter 75. In another aspect, the frequency detector 70 does not include the second inverter 75 according to the circuit configuration in the error amplifier 13, e.g., the error amplifier 13 including an inverter at upstream of the bias current I31 as one control element of the bias current I31.

Please referring to FIGS. 12A to 12F together, operation of the frequency detector 70 when a phase of the second detected signal V_sin+ leads a phase of the fourth detected signal V_cos+ as well as the input signal has a low frequency is described hereinafter.

Figure 12A:
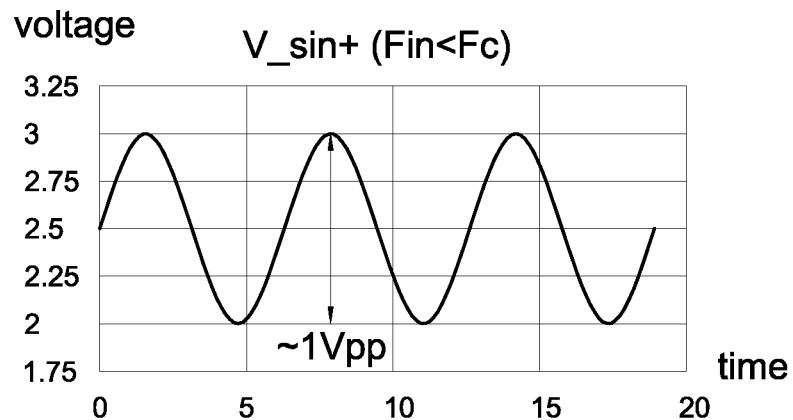
FIGS. 12A-12F are signal timing diagrams of a frequency detector of a light control circuit according to another embodiment of the present disclosure, wherein a signal frequency is lower than a cutoff frequency.
Figure 12B:
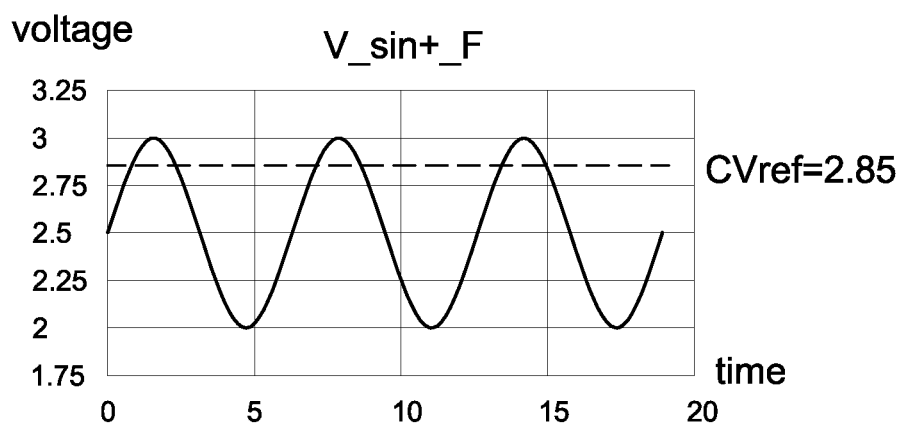

The low pass filter 71 has a cutoff frequency Fc (e.g., as a frequency threshold for identifying high/low of the signal frequency) and is used to filter the second detected signal V_sin+, which has a signal frequency Fin. As shown in FIG. 12A, it is assumed that the signal frequency Fin is smaller than the cutoff frequency Fc and has a peak-to-peak voltage about 1 volt. Since the signal frequency Fin is smaller than the cutoff frequency Fc, a peak-to-peak voltage of the filtered second detected signal V_sin+_F, shown in FIG. 12B, is substantially equal to (ignoring the attenuation of the filter) the second detected signal V_sin+.

The first comparator 72 compares the filtered second detected signal V_sin+_F and a first reference voltage CVref to output a comparison signal C_out. The first reference voltage CVref is arranged as, for example, a summation of an average (e.g., 2.5 volt) of the second detected signal V_sin+ and a predetermined voltage (e.g., 0.35 volt), e.g., CVref shown as 2.85 volt in FIG. 12B, but the present disclosure is not limited thereto. The first reference voltage CVref is arranged as any proper value as long as it is smaller than a peak value of the second detected signal V_sin+ and pulses shown in FIG. 12C are obtainable.

Figure 12C:
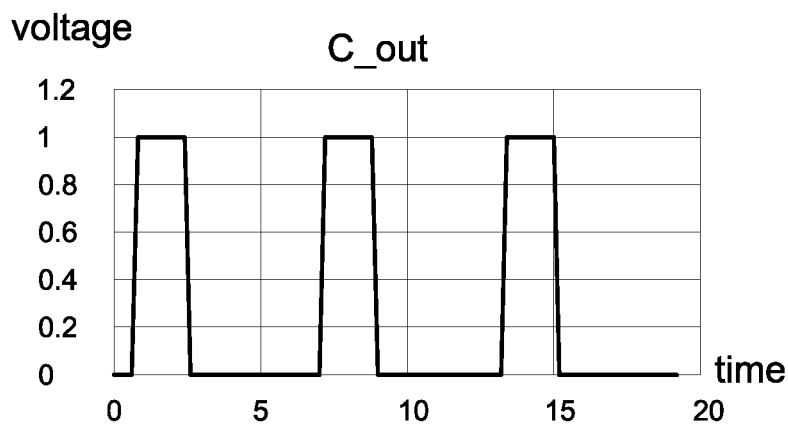

As shown in FIG. 12C, when the filtered second detected signal V_sin+_F is larger than the first reference voltage CVref, the comparison signal C_out has positive pulses.

Figure 12D:
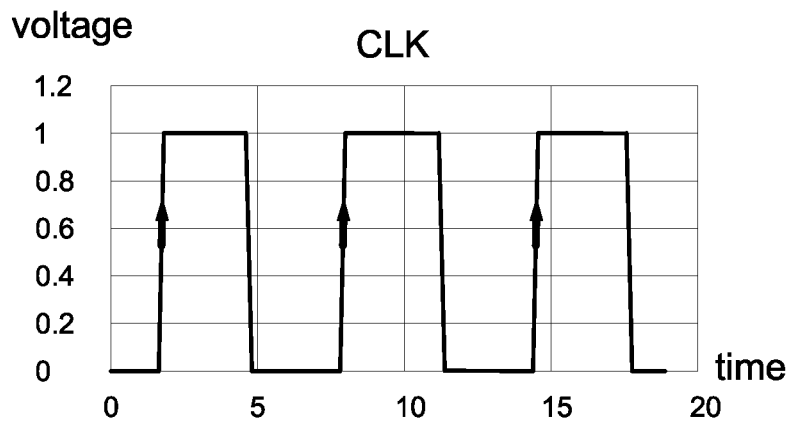

The second comparator 73 compares the fourth detected signal V_cos+ and a second reference voltage Vs/2 to output a clock signal CLK, as shown in FIG. 12D, wherein Vs is, for example, a power source voltage of the controller 10, but not limited to. The second reference voltage Vs/2 is selected as other values as long as pulses shown in FIG. 12D are obtainable. When the fourth detected signal V_cos+ is larger than the second reference voltage Vs/2, positive pulses of the clock signal CLK are generated.

Figure 12E:
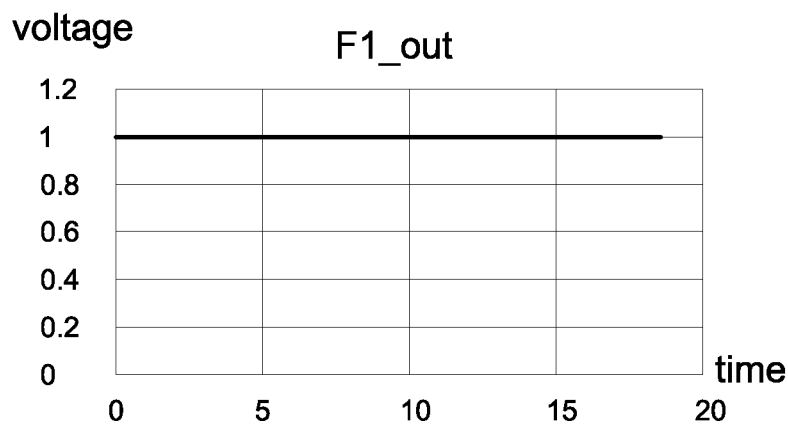

A data input D of the first flip flop 74 receives the comparison signal C_out, a clock input CLK_in of the first flip flop 74 receives the clock signal CLK, and an output Q of the first flip flop 74 generates a first output signal F1_out which is used to change a bandwidth of the error amplifier 13 to regulate a response time of the drive current of the light source 30. As shown in FIGS. 12C to 12D, the output Q of the first flip flop 74 tracks the comparison signal C_out at rising edges of the clock signal CLK such that the first output signal F1_out has a high level (e.g., shown as 1 volt, but not limited to) as shown in FIG. 12E.

Figure 12F:
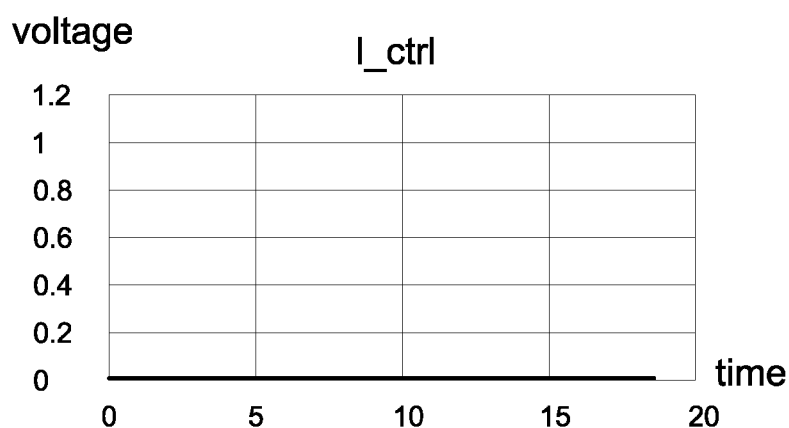

As mentioned above, when the frequency detector 70 does not include the second invertor 75, the frequency detector 70 outputs the high-level first output signal F1_out (as the control signal I_ctrl) to the error amplifier 13, and in this case the frequency detector 70 does not include the OR gate 78. When the frequency detector 70 includes the second inverter 75 coupled between the first flip flop 74 and the error amplifier 13, the frequency detector 70 outputs a low-level control signal I_ctrl (e.g., 0 volt, but not limited to) to the error amplifier 13, as shown in FIG. 12F.

In this aspect, when a signal frequency Fin of the second detected signal V_sin+ is lower than the cutoff frequency Fc, the control signal I_ctrl does not turn on the bias current I31. In the present disclosure, turning on the bias current I31 means speeding up the response time of the error amplifier 13.

Next, operation of the frequency detector 70 when a phase of the second detected signal V_sin+ leads a phase of the fourth detected signal V_cos+ as well as the input signal has a high frequency.

Figure 13A:
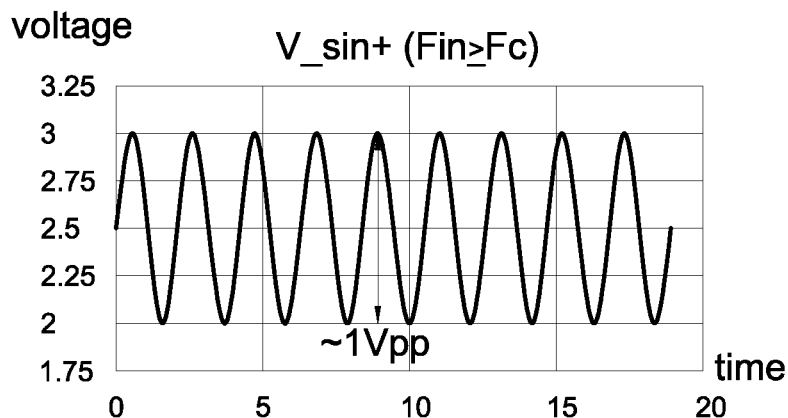
FIGS. 13A-13F are signal timing diagrams of a frequency detector of a light control circuit according to another embodiment of the present disclosure, wherein a signal frequency is higher than a cutoff frequency.
Figure 13B:
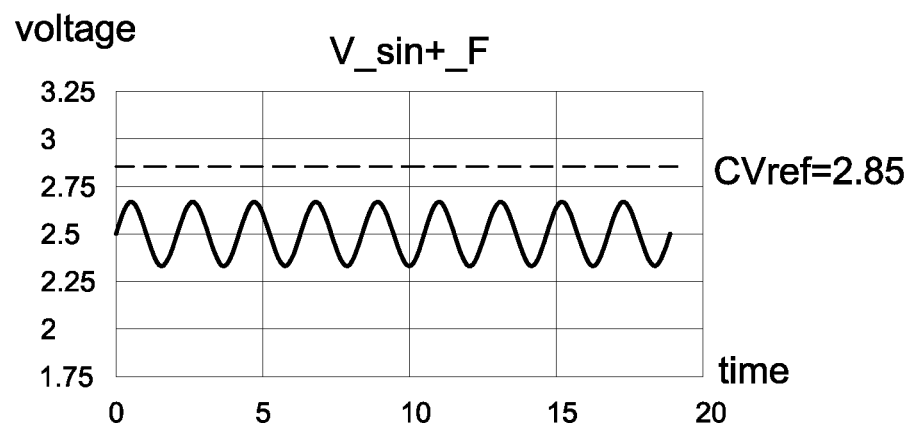

As shown in FIG. 13A, it is assumed that the signal frequency Fin is larger than or equal to the cutoff frequency Fc and has a peak-to-peak voltage about 1 volt. Since the signal frequency Fin is larger than the cutoff frequency Fc, a peak-to-peak voltage of the filtered second detected signal V_sin+_F is smaller than the second detected signal V_sin+, as shown in FIG. 13B.

The first comparator 72 compares the filtered second detected signal V_sin+_F and the first reference voltage CVref to output a comparison signal C_out.

Figure 13C:
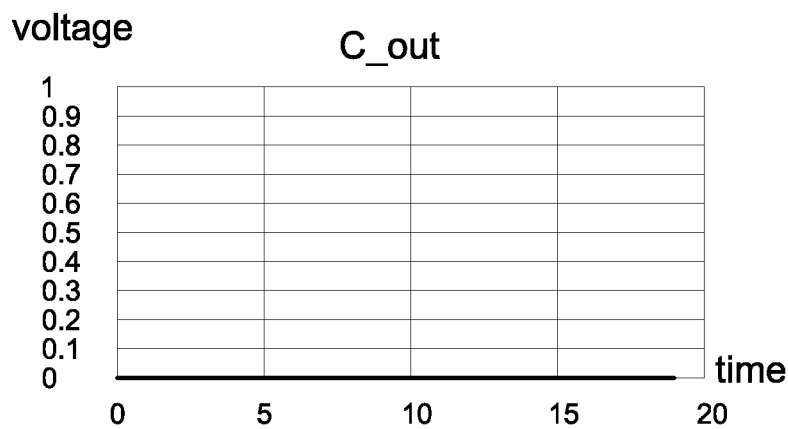

As shown in FIG. 13C, since the second detected signal V_sin+_F is always smaller than the first reference voltage CVref, the comparison signal C_out is substantially equal to 0, but not limited to 0.

Figure 13D:
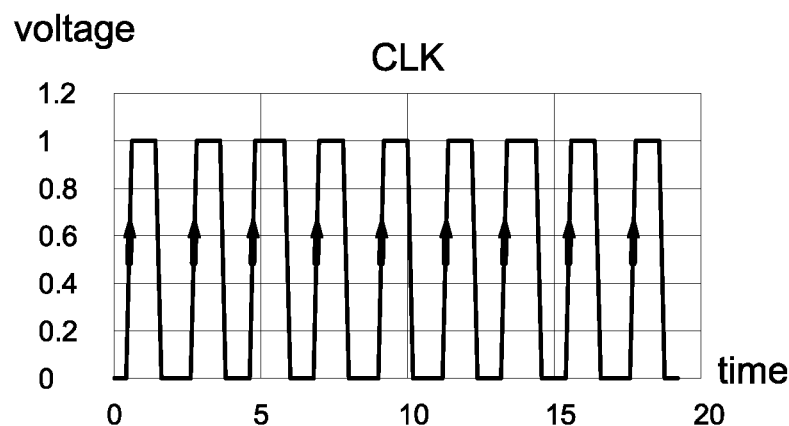

Similarly, the second comparator 73 compares the fourth detected signal V_cos+ and the second reference voltage Vs/2 to output a clock signal CLK, as shown in FIG. 13D. When the fourth detected signal V_cos+ is larger than the second reference voltage Vs/2, positive pulses of the clock signal CLK are generated.

Figure 13E:
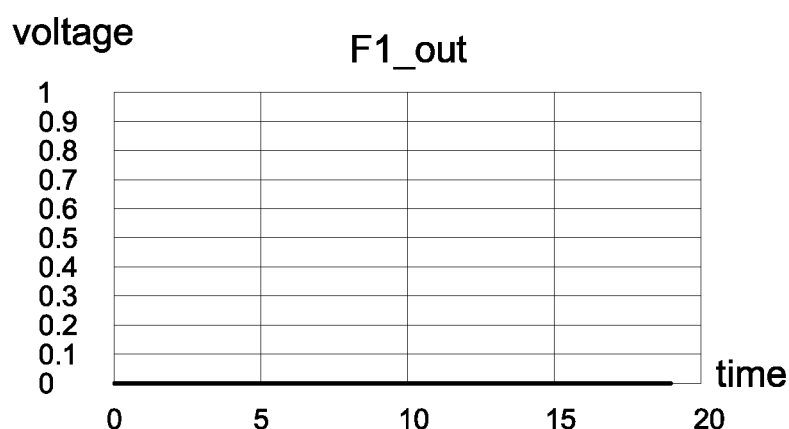

Similarly, a data input D of the first flip flop 74 receives the comparison signal C_out, a clock input CLK_in of the first flip flop 74 receives the clock signal CLK, and an output Q of the first flip flop 74 generates a first output signal F1_out. As shown in FIGS. 13C to 13D, the output Q of the first flip flop 74 tracks the comparison signal C_out at rising edges of the clock signal CLK such that the first output signal F1_out always at a low level (e.g., shown as 0 volt, but not limited to) as shown in FIG. 13E.

Figure 13F:
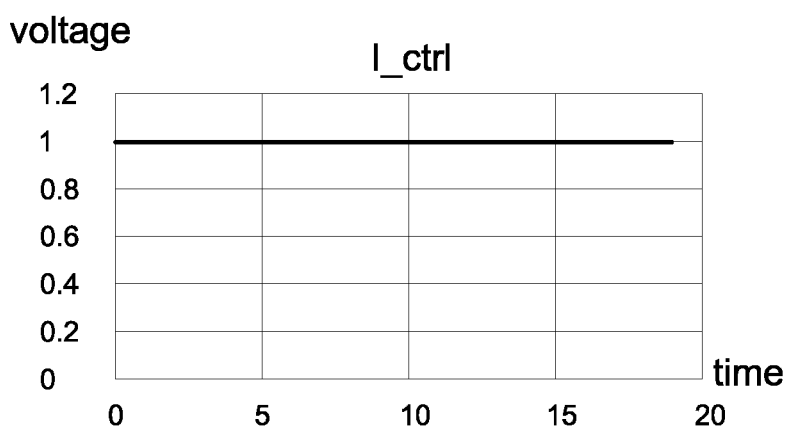

As mentioned above, when the frequency detector 70 does not include the second invertor 75, the frequency detector 70 outputs the low-level first output signal F1_out (as the control signal I_ctrl) to the error amplifier 13. When the frequency detector 70 includes the second inverter 75 coupled between the first flip flop 74 and the error amplifier 13, the frequency detector 70 outputs a high-level control signal I_ctrl (e.g., 1 volt, but not limited to) to the error amplifier 13, as shown in FIG. 13F.

In this aspect, when a signal frequency Fin of the second detected signal V_sin+ is higher than the cutoff frequency Fc, the control signal I_ctrl turns on the bias current I31 to speed up the regulation response time of the error amplifier 13 corresponding to the faster-rotated encoding medium 40.

In the above aspect, the encoding medium 40 is rotated toward only one direction (i.e. the direction causing V_sin+ leading V_cos+). When the encoding medium 40 is able to be rotated toward two opposite directions to cause the second detected signal V_sin+ to lead or lag the fourth detected signal V_cos+ by 90 degrees, the frequency detector 70 further includes a first inverter 76, a second flip flop 77 and an OR gate 78, as shown in FIG. 11, in order to control the bias current I31 in the error amplifier 13 in said two directions.

When the encoding medium 40 is rotated in a direction that causes V_sin+ to lead V_cos+, the frequency detector 70 operates according to the descriptions of FIGS. 12A to 12F and FIGS. 13A to 13F as mentioned above such that the first flip flop 74 generates a first output signal F1_out to the OR gate 78.

When the encoding medium 40 is rotated in a direction that causes V_sin+ to lag V_cos+, the first inverter 76 inverts a phase of the clock signal CLK to generate a phase-inverted clock signal CLK_B. A data input D of the second flip flop 77 receives the comparison signal C_out, a clock input CLK_in of the second flip flop 77 receives the phase-inverted clock signal CLK_B, and an output Q of the second flip flop 77 generates a second output signal F2_out which is used to change a bandwidth of the error amplifier 13 to regulate a response time of the drive current of the light source 30.

Please referring to FIGS. 14A to 14F together, operation of the frequency detector 70 when a phase of the second detected signal V_sin+ lags a phase of the fourth detected signal V_cos+ as well as the input signal has a low frequency is described hereinafter.

Figure 14A:
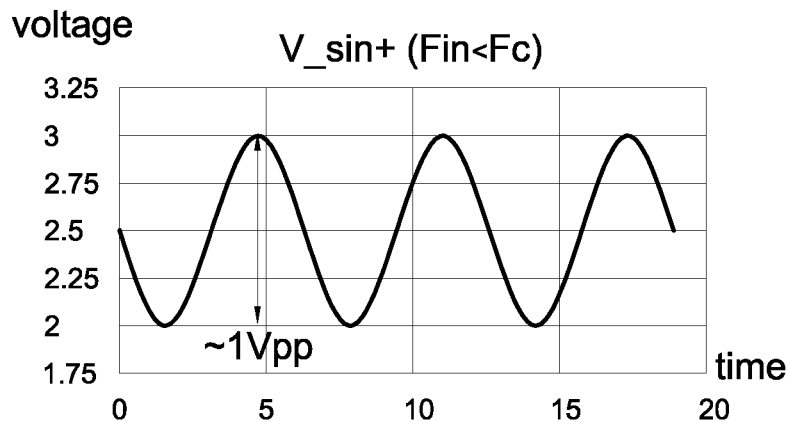
FIGS. 14A-14F are signal timing diagrams of a frequency detector of a light control circuit according to another embodiment of the present disclosure, in which an encoding medium rotates in a direction opposite to FIGS. 12A-12F.
Figure 14B:
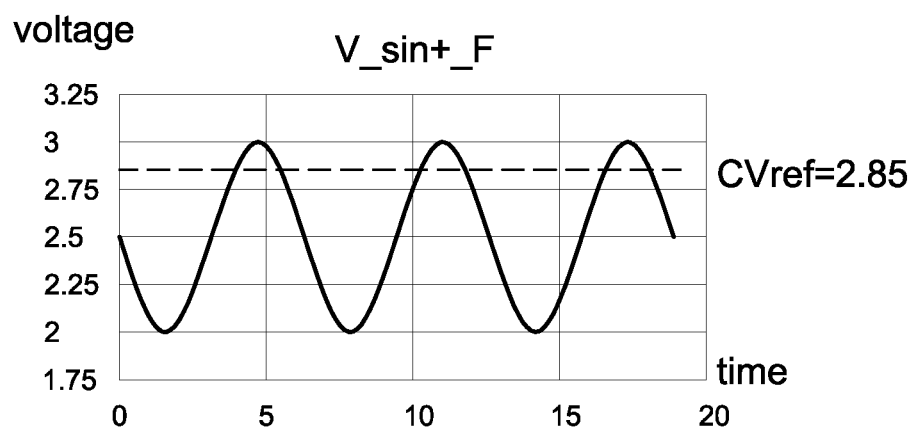

The low pass filter 71 has a cutoff frequency Fc and is used to filter the second detected signal V_sin+, which has a signal frequency Fin. As shown in FIG. 14A, it is assumed that the signal frequency Fin is smaller than the cutoff frequency Fc and has a peak-to-peak voltage about 1 volt. Since the signal frequency Fin is smaller than the cutoff frequency Fc, a peak-to-peak voltage of the filtered second detected signal V_sin+_F is substantially equal to the second detected signal V_sin+.

The first comparator 72 compares the filtered second detected signal V_sin+_F and a first reference voltage CVref (also shown as 2.85 volt in FIG. 14B, but not limited to) to output a comparison signal C_out.

Figure 14C:
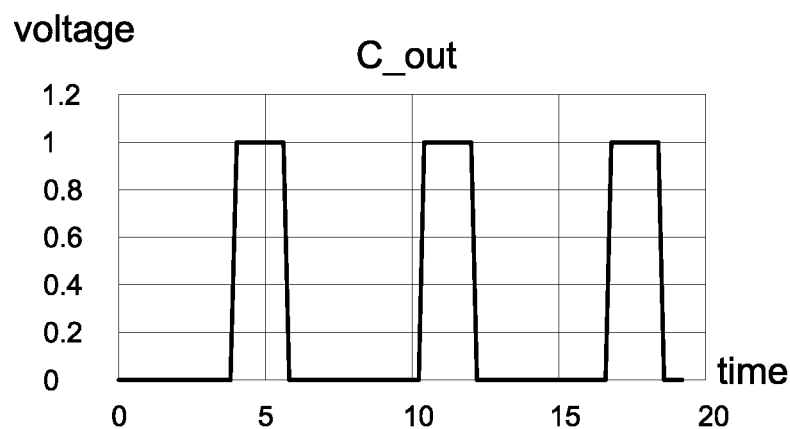

As shown in FIG. 14C, when the filtered second detected signal V_sin+_F is larger than the first reference voltage CVref, the comparison signal C_out has positive pulses.

Figure 14D:
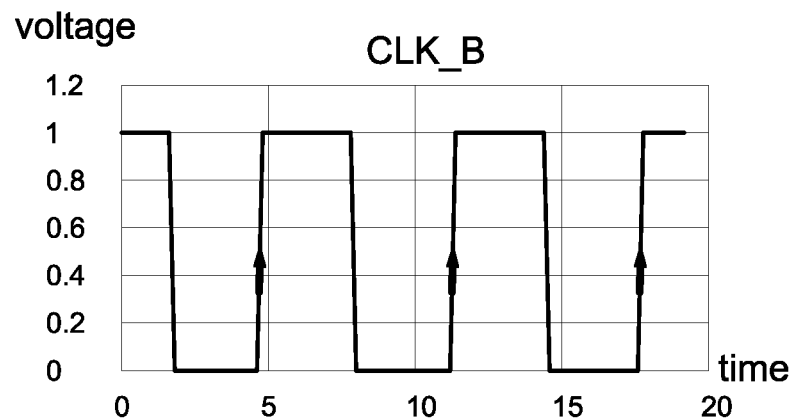

Similarly, the second comparator 73 compares the fourth detected signal V_cos+ and a second reference voltage Vs/2 to output a clock signal CLK. FIG. 14D shows the phase-inverted clock signal CLK_B after the first inverter 76.

Figure 14E:
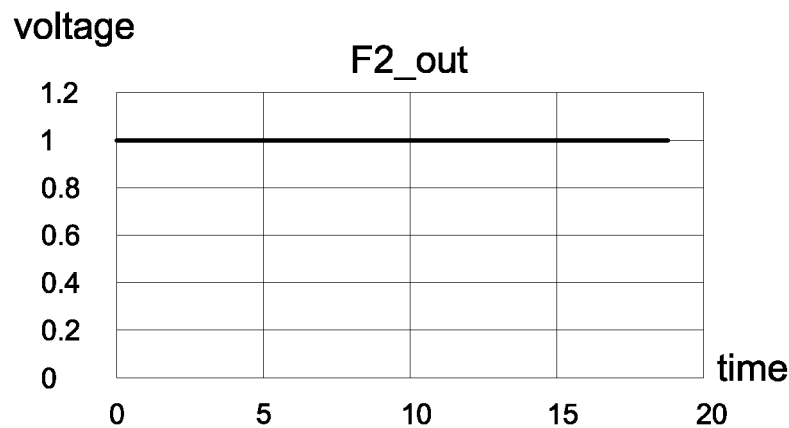
Figure 14F:
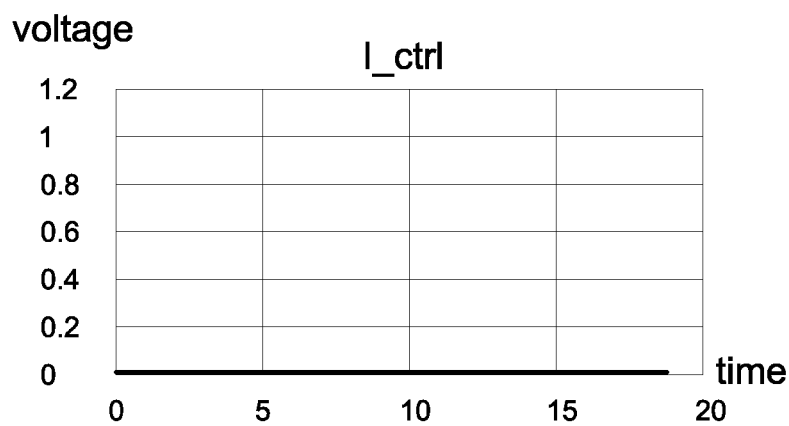

A data input D of the second flip flop 77 receives the comparison signal C_out, a clock input CLK_in of the second flip flop 77 receives the phase-inverted clock signal CLK_B, and an output Q of the second flip flop 77 generates a second output signal F2_out which is used to change a bandwidth of the error amplifier 13 to regulate a response time of the drive current of the light source 30. As shown in FIGS. 14C to 14D, the output Q of the second flip flop 77 tracks the comparison signal C_out at rising edges of the phase-inverted clock signal CLK_B such that the second output signal F2_out has a high level (e.g., shown as 1 volt, but not limited to) as shown in FIG. 14E.

In this case, the first flip flop 74 also operates but only outputs a low-level first output signal F1_out.

The operation of the frequency detector 70 when a phase of the second detected signal V_sin+ lags a phase of the fourth detected signal V_cos+ as well as the input signal has a high frequency is understood after understanding FIGS. 13A to 13F and FIGS. 14A to 14F and descriptions thereof, and thus details thereof are not repeated herein.

In this aspect, the OR gate 78 receives the first output signal F1_out and the second output signal F2_out. When the frequency detector 70 does not include the second invertor 75, output of the OR gate 78 is used as the control signal I_ctrl to control the bias current I31 in the error amplifier 13. When the frequency detector 70 includes the second inverter 75 coupled between the OR gate 78 and the error amplifier 13, output of the second inverter 75 is used as the control signal I_ctrl.

In this aspect, when a signal frequency Fin of the second detected signal V_sin+ is lower than the cutoff frequency Fc, the control signal I_ctrl (i.e. the first output signal F1_out, the second output signal F2_out, the phase-inverted first output signal or the phase-inverted second output signal) does not turn on the bias current I31. When the signal frequency Fin of the second detected signal V_sin+ is higher than or equal to the cutoff frequency Fc, the control signal I_ctrl turns on the bias current I31 to speed up the response time of the error amplifier 13 corresponding to the fast-rotated encoding medium 40.

Figure 15:
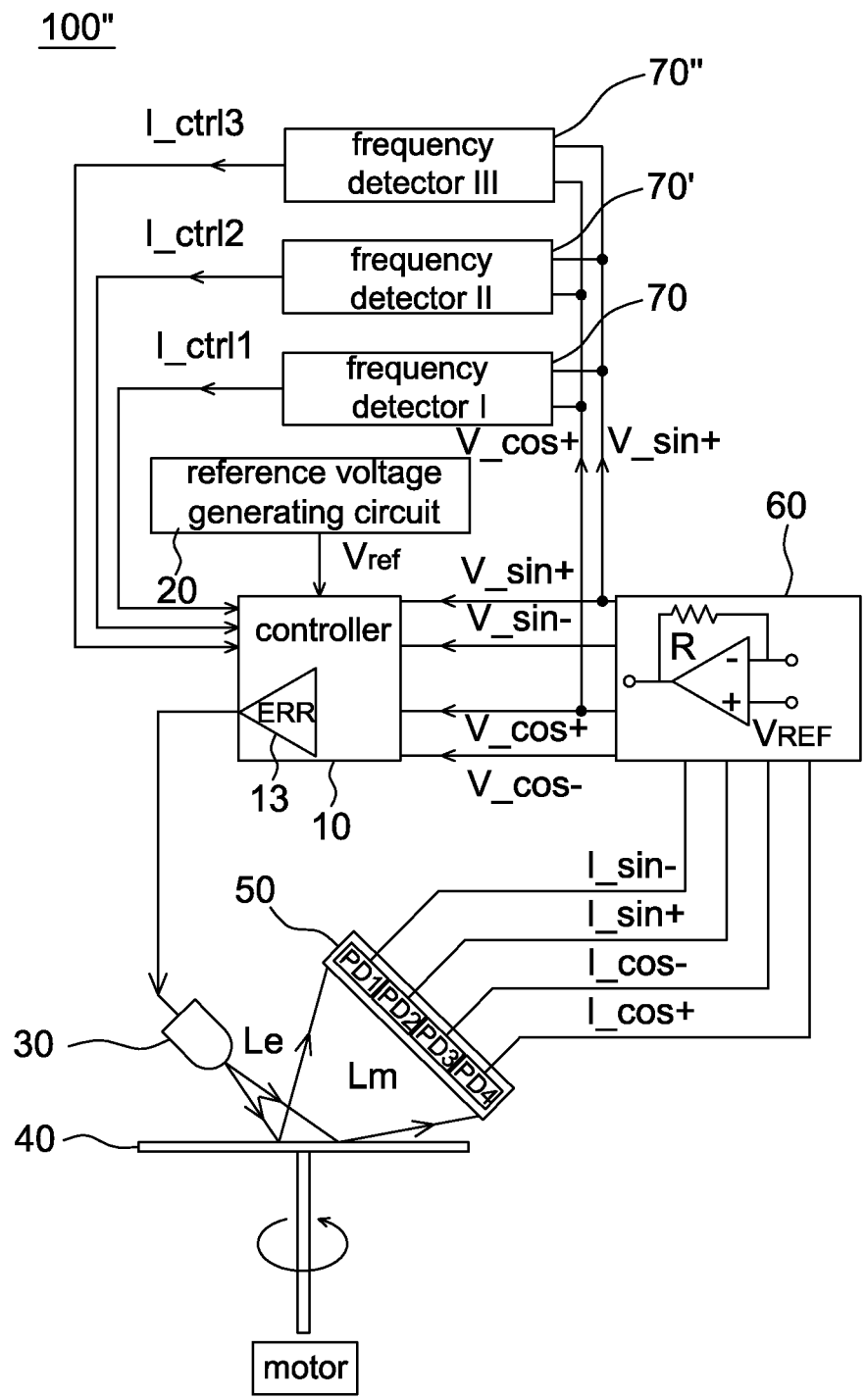
FIG. 15 is a schematic block diagram of a light control circuit according to an alternative embodiment of the present disclosure.

In addition, the present disclosure further controls different current values of the bias current I31 according to different rotation speeds of the encoding medium 40. Referring to FIG. 15 as an example, it is a schematic block diagram of an optical encoder system 100″ according to an alternative embodiment of the present disclosure. The difference between FIG. 15 and FIG. 10A is that the optical encoder system 100″ in FIG. 15 includes multiple frequency detectors (e.g., shown as a first frequency detector 70, second frequency detector 70′ and third frequency detector 70″, but the number is not limited to three).

Each of the multiple frequency detectors has the structure of FIG. 11, and is used to generate a control signal (e.g., shown as I_ctrl1, I_ctrl2 and I_ctrl3) according to the second detected signal V_sin+ and the fourth detected signal V_cos+ to change a bandwidth of the error amplifier 13 to regulate a response time of the drive current of the light source 30. In this aspect, each of the multiple frequency detectors has a respective cutoff frequency Fc as a frequency threshold for being compared with a signal frequency Fin of input signals (i.e. the detected signals) to generate a respective control signal corresponding to different motor rotation speeds, wherein the method of each frequency detector for generating the respective control signal has been described above, and thus details thereof are not repeated herein.

If the optical encoder system 100″ shown in FIG. 15 is used, six (combining the three control signals) or three (not combining the three control signals) kinds of the regulation response time of the error amplifier 13 are controllable corresponding to six or three rotation speeds. The control signals I_ctrl1, I_ctrl2 and I_ctrl3 are arranged to respectively control a respective bias current or control one bias current together.

Similarly, one aspect of the controller 10 in FIG. 15 is shown in FIG. 10 also including a detected voltage generating circuit 101, an error amplifier 13 and an NMOS driver 15, but not limited thereto.

Figure 16:
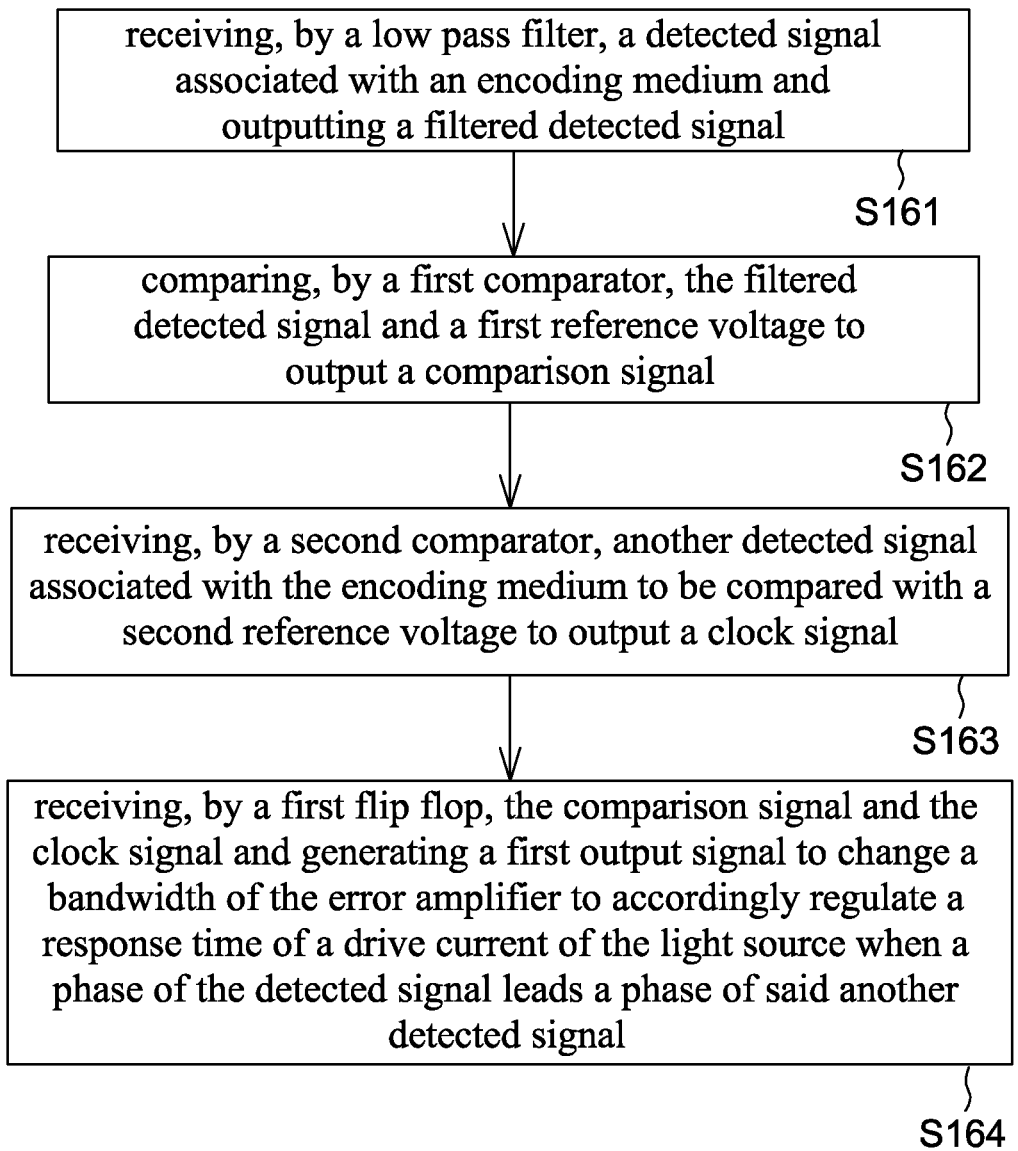
FIG. 16 is a flow chart of an operating method of a light control circuit according to another embodiment of the present disclosure.

Referring to FIG. 16, it is a flow chart of an operating method of a light control circuit of an optical encoder system 100' according to one embodiment of the present disclosure, including the steps of: receiving, by a low pass filter 71, a detected signal associated with an encoding medium 40 and outputting a filtered detected signal (Step S161); comparing, by a first comparator 72, the filtered detected signal and a first reference voltage to output a comparison signal (Step S162); receiving, by a second comparator 73, another detected signal associated with the encoding medium 40 to be compared with a second reference voltage to output a clock signal, wherein a phase of the detected signal leads or lags a phase of the another detected signal by 90 degrees (Step S163); and receiving, by a first flip flop 71, the comparison signal and the clock signal and generating a first output signal to change a bandwidth of an error amplifier 13 to accordingly regulate a response time of a drive current of a light source 30 when the phase of the detected signal leads the phase of the another detected signal (Step S164).

As mentioned above, the TIA 60 respectively generates a first detected signal V_sin−, a second detected signal V_sin+, a third detected signal V_cos− and a fourth detected signal V_cos+according to a first current signal I_sin−, a second current signal I_sin+, a third current signal I_cos− and a fourth current signal I_cos+ generated by the light detector 50. The low pass filter 71 receives the second detected signal V_sin+ to output a filtered second detected signal V_sin+_F (Step S161). Next, the first comparator 72 compares the filtered second detected signal V_sin+_F with a first reference voltage CVref to output a comparison signal C_out (Step S162). Meanwhile, the second comparator 73 receives the fourth detected signal V_cos+which is compared with a second reference voltage Vs/2 to output a clock signal CLK (Step S163). When a phase of the second detected signal V_sin+ leads the fourth detected signal V_cos+, the first flip flop 71 receives the comparison signal C_out and the clock signal CLK and generates a first output signal F1_out, referring to FIGS. 12A to 12F and FIGS. 13A to 13F as well as corresponding descriptions thereof.

If the encoding medium 40 rotates toward only one direction, the first output signal F1_out or the phase-inverted first output signal passing the second inverter 75 is used as the control signal I_ctrl.

However, when a phase of the second detected signal V_sin+ lags the fourth detected signal V_cos+due to a different rotation direction of the encoding medium 40, the first inverter 76 inverts the clock signal CLK to generate a phase-inverted clock signal CLK_B. Next, the second flip flop 77 receives the comparison signal C_out and the phase-inverted clock signal CLK_B and generates a second output signal F2_out, referring to FIGS. 14A to 14F and corresponding descriptions.

Next, the OR gate 78 receives the first output signal F1_out and the second output signal F2_out. It should be mentioned that the first flip flop 74 and the second flip flop 77 may operate together but only one of them outputs the high-level output signal at low input signal frequency.

As mentioned above, when the light control circuit does not include the second inverter 75, an output signal of the OR gate 78 is used as the control signal I_ctrl for changing a bandwidth of the error amplifier 13 to regulate a response time of the drive current of the light source 30. When the light control circuit includes the second inverter 75, the output signal of the OR gate 78 is inverted by the second inverted 75 to become the control signal I_ctrl.

As mentioned above, in the configuration of FIG. 11, when a signal frequency Fin of the second detected signal V_sin+ is lower than the cutoff frequency Fc of the low pass filter 71, the first output signal F1_out or the second output signal F2_out does not turn on the bias current I31; whereas, when the signal frequency Fin of the second detected signal V_sin+ is higher than or equal to the cutoff frequency Fc of the low pass filter 71, the first output signal F1_out or the second output signal F2_out turns on the bias current I31.

It should be mentioned that although FIGS. 10A to 10B, FIG. 11 and FIG. 15 show that the frequency detector 70 generates the control signal I_ctrl according to the second detected signal V_sin+ and the fourth detected signal V_cos+, the present disclosure is not limited thereto. In other aspects, the frequency detector 70 generates the control signal I_ctrl according to the first detected signal V_sin− and the third detected signal V_cos−. That is, one of input signals of the frequency detector 70 is a sine voltage signal and the other one is a cosine voltage signal.

It should be mentioned that although FIGS. 12A to 12B, FIGS. 13A to 13B and FIGS. 14A to 14B show that the detected signals are sinusoidal signals, but the present disclosure is not limited thereto. According to different arrangements of slits on the encoding medium 40, the detected signals may have other shapes.

It should be mentioned that although the above embodiments are described in the way that the frequency detector 70 includes a low pass filter 71, but the present disclosure is not limited thereto. In other aspects, the frequency detector 70 includes a high pass filter or a bandpass filter to replace the low pass filter such that when the filtered detected signal inputted into the first comparator 72 is within or outside a predetermined frequency range, the comparison signal has or does not have positive pulses as data input of the flip flop. For example, when a high pass filter is used, the frequency detector 70 does not include the second inverter 75.

If it is required, the control signal I_ctrl outputted by the frequency detector 70 is further used to control other elements, instead of the error amplifier 13, among the optical encoder system 100' and 100".

Figure 1:
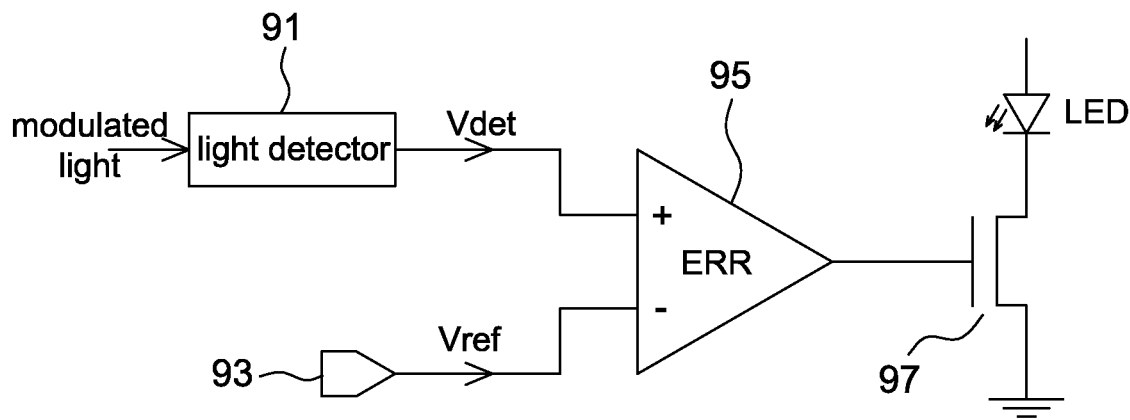
FIG. 1 is a schematic diagram of a conventional light control circuit.
Figure 2A:
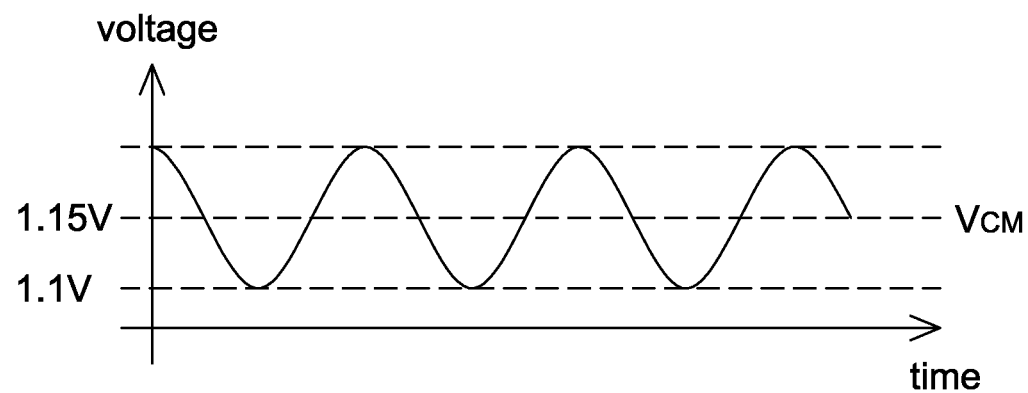
FIG. 2A is a voltage signal without a dc offset outputted by the light control circuit in FIG. 1.
Figure 2B:
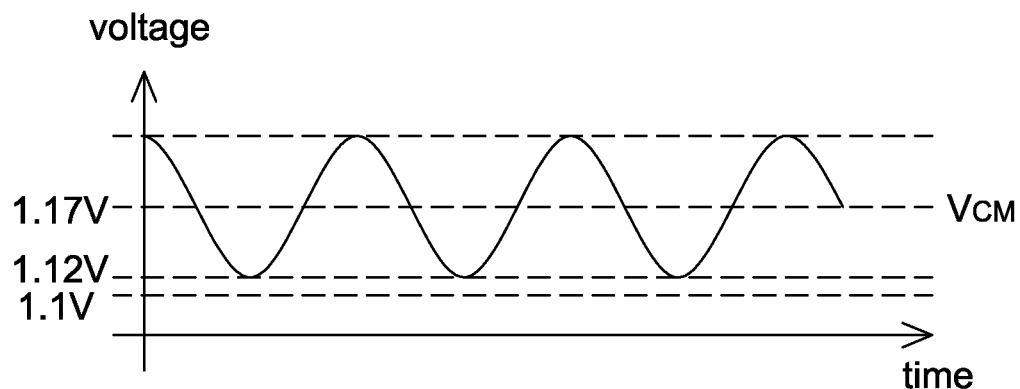
FIG. 2B is a voltage signal with a dc offset outputted by the light control circuit in FIG. 1.

As mentioned above, the conventional light control circuit can be affected by dark current leakage and reflected light leakage to be unable to correctly control brightness of a light source. Accordingly, the present disclosure further provides a light control circuit (e.g., FIG. 9) and an optical encoder system (e.g. FIG. 1) that eliminate the common mode voltage in the detected signal using a squaring circuit at first and then compare a detected voltage signal with a desired control voltage. As the dc offset is eliminated in the differential operation and the desired control voltage is also changed with the environmental change, a drive current of the light source is effectively stabilized.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A frequency detector of an optical encoder system, the frequency detector configured to receive a first detected signal and a second detected signal from a trans-impedance amplifier of the optical encoder system, the frequency detector comprising:
- a low pass filter, configured to filter the first detected signal and having a cutoff frequency;
- a first comparator, configured to compare the filtered first detected signal and a first reference voltage to output a comparison signal;
- a second comparator, configured to compare the second detected signal and a second reference voltage to output a clock signal; and
- a flip flop, a data input thereof being configured to receive the comparison signal, a clock input thereof being configured to receive the clock signal, and an output thereof being configured to generate an output signal, which is configured to change a bandwidth of an error amplifier of the optical encoder system when a phase of the first detected signal leads a phase of the second detected signal.

2. The frequency detector as claimed in claim 1, further comprising an inverter coupled downstream of the flip flop.

3. The frequency detector as claimed in claim 1, wherein the first reference voltage is arranged as a summation of an average of the first detected signal and a predetermined voltage, and
the first reference voltage is smaller than a peak value of the first detected signal.

4. The frequency detector as claimed in claim 1, wherein the first detected signal is a sine voltage signal, and the second detected signal is a cosine voltage signal.

5. The frequency detector as claimed in claim 1, wherein the output signal is configured to be outputted to a controller of the optical encoder system to regulate a response time of a drive current of a light source by changing the bandwidth of the error amplifier.

6. The frequency detector as claimed in claim 5, wherein the second reference voltage is a half of a voltage source voltage of the controller.

7. The frequency detector as claimed in claim 1, further comprising:
- an inverter configured to invert a phase of the clock signal; and
- a second flip flop, a data input thereof being configured to receive the comparison signal, a clock input thereof being configured to receive the phase-inverted clock signal, and an output thereof being configured to generate a second output signal, which is configured to change the bandwidth of the error amplifier when the phase of the first detected signal lags the phase of the second detected signal.

8. The frequency detector as claimed in claim 7, further comprising:
- an OR gate configured to receive the first output signal and the second output signal.

9. An operating method of a frequency detector of an optical encoder system, which comprises a trans-impedance amplifier, the frequency detector comprising a low pass filter, a first comparator, a second comparator and a first flip flop, the operating method comprising:
- receiving, by the low pass filter, a first detected signal from the trans-impedance amplifier and outputting a filtered first detected signal;
- comparing, by the first comparator, the filtered first detected signal and a first reference voltage to output a comparison signal;
- receiving, by the second comparator, a second detected signal from the trans-impedance amplifier to be compared with a second reference voltage to output a clock signal, wherein a phase of the first detected signal leads or lags a phase of the second detected signal by 90 degrees; and
- receiving, by the first flip flop, the comparison signal and the clock signal and generating a first output signal to change a bandwidth of an error amplifier of the optical encoder system when the phase of the first detected signal leads the phase of the second detected signal.

10. The operating method as claimed in claim 9, wherein the frequency detector further comprises a first inverter and a second flip flop, and when the phase of the first detected signal lags the phase of the second detected signal, the operating method further comprises:
- inverting a phase of the clock signal by the first inverter; and
- receiving, by the second flip flop, the comparison signal and the phase-inverted clock signal and generating a second output signal to change the bandwidth of the error amplifier.

11. The operating method as claimed in claim 10, wherein the frequency detector further comprises an OR gate, and a second inverter coupled downstream of the OR gate, and the operating method further comprises:
- receiving the first output signal and the second output signal by the OR gate; and
- inverting an output signal of the OR gate by the second inverter.

12. A light control circuit of an optical encoder system, configured to control a light source, the light control circuit comprising:
- a controller, comprising an error amplifier which is configured to control a drive current of the light source; and
- a frequency detector, configured to receive a first detected signal and a second detected signal from a trans-impedance amplifier of the optical encoder system, wherein a phase of the first detected signal leads or lags a phase of the second detected signal by 90 degrees, and comprising:
  - a low pass filter configured to filter the first detected signal and having a cutoff frequency;
  - a first comparator configured to compare the filtered first detected signal and a first reference voltage to output a comparison signal;
  - a second comparator configured to compare the second detected signal and a second reference voltage to output a clock signal;
  - a first flip flop, a data input thereof being configured to receive the comparison signal, a clock input thereof being configured to receive the clock signal, and an output thereof being configured to generate a first output signal, which is configured to change a bandwidth of the error amplifier to regulate a response time of the drive current of the light source when the phase of the first detected signal leads the phase of the second detected signal by 90 degrees;
  - a first inverter configured to invert a phase of the clock signal; and
  - a second flip flop, a data input thereof being configured to receive the comparison signal, a clock input thereof being configured to receive the phase-inverted clock signal, and an output thereof being configured to generate a second output signal, which is configured to change the bandwidth of the error amplifier to regulate the response time when the phase of the first detected signal lags the phase of the second detected signal by 90 degrees.

13. The light control circuit as claimed in claim 12, wherein the frequency detector further comprises:
- an OR gate configured to receive the first output signal and the second output signal; and
- a second inverter coupled between the OR gate and the error amplifier.

14. The light control circuit as claimed in claim 12, wherein the error amplifier comprises a bias current configured to change the bandwidth thereof,
- when a signal frequency of the first detected signal is lower than the cutoff frequency, the first output signal or the second output signal does not turn on the bias current, and
- when the signal frequency of the first detected signal is higher than the cutoff frequency, the first output signal or the second output signal turns on the bias current.

15. The light control circuit as claimed in claim 14, further comprising another frequency detector configured to generate another output signal according to the first detected signal and the second detected signal, said another output signal being configured to change the bandwidth of the error amplifier to regulate the response time, wherein said another frequency detector comprises another low pass filter having another cutoff frequency that is different from the cutoff frequency of the low pass filter.

16. The light control circuit as claimed in claim 12, wherein
- the first reference voltage is arranged as a summation of an average of the first detected signal and a predetermined voltage, and
- the first reference voltage is smaller than a peak value of the first detected signal.

17. The light control circuit as claimed in claim 12, wherein the second reference voltage is a half of a voltage source voltage of the controller.

18. The light control circuit as claimed in claim 12, wherein the first detected signal is a sine voltage signal, and the second detected signal is a cosine voltage signal.

* * * * *